United States Patent
Kaburagi

(10) Patent No.: US 7,170,636 B2
(45) Date of Patent: Jan. 30, 2007

(54) IMAGE PROCESSING APPARATUS AND ITS CONTROL METHOD

(75) Inventor: Hiroshi Kaburagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 996 days.

(21) Appl. No.: 10/174,989

(22) Filed: Jun. 20, 2002

(65) Prior Publication Data
US 2003/0002082 A1    Jan. 2, 2003

(30) Foreign Application Priority Data
Jun. 25, 2001    (JP)    ............... 2001-191844

(51) Int. Cl.
*H04N 1/405* (2006.01)
*H04N 1/407* (2006.01)

(52) U.S. Cl. ............. 358/1.9; 358/3.05; 358/3.06; 358/3.21

(58) Field of Classification Search ...... 358/3.03–3.05, 358/3.21–3.22, 3.06, 1.9, 534–536, 465–466; 382/252
See application file for complete search history.

(56) References Cited

U.S. PATENT DOCUMENTS 6,891,632 B1 *    5/2005    Schwartz ............... 358/1.15

* cited by examiner

*Primary Examiner*—Scott A. Rogers
(74) *Attorney, Agent, or Firm*—Fitzpatrick, Cella, Harper & Scinto

(57) ABSTRACT

When input N-bit multi-valued image information having density information is converted into M-bit (N≧M) image information and the converted image information is output, information (S signal) indicating whether or not an image conversion process is executed for one line including a pixel of interest of the multi-valued image information is generated on the basis of the multi-valued image information. Only when the S signal indicating that the image conversion process is to be skipped successively appears for a number of times equal to or larger than "the number of lines required for the process"+1, the control is made to forcibly set the processing result of the image conversion process to be a predetermined value, and to inhibit execution of the image conversion process for one line including the pixel of interest of the multi-valued image data.

22 Claims, 25 Drawing Sheets

FIG. 9

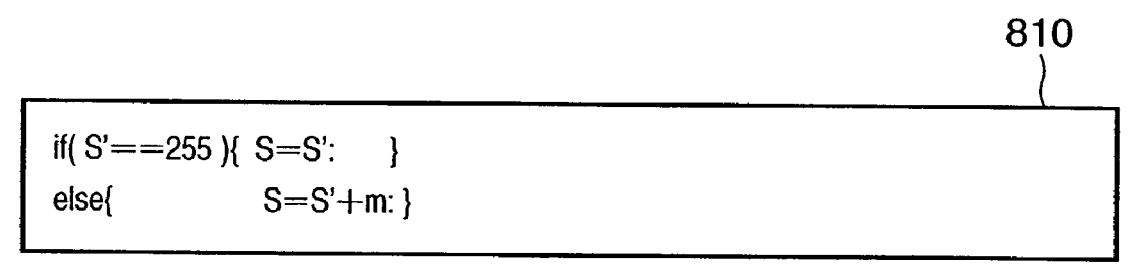

```
if( S'==255 ){  S=S':    }
else{           S=S'+m: }
```
810

FIG. 16

|  M35 | M34 | M33 | M32 | M31 |
|------|-----|-----|-----|-----|
|  M25 | M24 | M23 | M22 | M21 |
|  M15 | M14 |     |     |     |

PIXEL OF INTEREST

```
INITIALIZATION
    for( ii=25; ii>=0; --ii ){ p[ii]=0; }
    p[12]=1;

RANDOM NUMBER GENERATION
    p[0]=( (p[25]^p[24]^p[23]^p[22]) & 1 );
    for( k=24; k>=0; --k ){
        p[k+1]=p[k];

}
    RANDOM NUMBER=(1−2*p[22])*(((p[15]*64+p[16]*32+p[17]*16
                 +p[18]*8+p[19]*4+p[20]*2+p[21])*17)/128)
```

GENERATED RANDOM NUMBER
$-17 \leq SH1 \leq 17$

FIG. 19

```
if( DR<=LR1 ){
    ‖ =0;
}
else if( LR1<DR && DR<=LR2 ){
    ‖ =( (DR-LR1) * (ALF * 256/(LR2-LR1)) )/256;
}
else if( LR2<DR && DR<=LR3 ){
    ‖ =ALF;
}
else if( LR3<DR && DR<=LR4 ){
    ‖ =ALF-( (DR-LR3) * (ALF * 256/(LR4-LR3)) )/256;
}
else {
    ‖ =0;
}
T= ‖ -ALFm
```

808

※
LR1 : CONSTANT(16)
LR2 : CONSTANT(48)
LR3 : CONSTANT(223)
LR4 : CONSTANT(255)
ALF : CONSTANT(32)
ALFm: CONSTANT(16)

if( B32==0 && B22==1 && B12==0 && B21==0 && B11==1 && B01==0 ){
    S'=255;
}
else if( Bi12==0 && Bi22==1 && Bi32==0 && B01==0 && Bi11==1 && Bi21==0 ){
    S'=255;
}
else if( B12==0 && B02==0 && Bi12==0 && Bi22==0 && Bi32==0
         && B11==0 && B01==0 && Bi11==1 && Bi21==0 && Bi31==0 && B20==0 && hi==1 ){
    if( D<31 ){ S'=255; }
    else{      S'=0; }
}
else if( B32==0 && B22==0 && B12==0 && B02==0 && Bi12==0
         && B31==0 && B21==0 && B11==1 && B01==0 && Bi11==0 && B20==0 && hi==1 ){
    if( D<31 ){ S'=255; }
    else{      S'=0; }
}
else if( B02==0 && Bi12==0 && B11==0 && B01==1 && Bi11==1 && Bi21==0 && B20==0 ){
    S'=-A;
}
else if( (B02==0 || Bi12==0 && B11==0 && B01==1 && Bi11==1 && Bi21==0 ){
    S'=-B;
}
else if( B12==0 && B02==0 && B21==0 && B11==1 && B01==1 && Bi11==0 && B20==0 ){
    S'=-A;
}
else if( (B12==0 || B02==0) && B21==0 && B11==1 && B01==1 && Bi11==0 ){
    S'=-B;
}
else if( B12==0 && B02==0 && B21==0 && Bi11==0 && Bi21==0 && B20==0 ){
    S'=-A;
}
else if( B12==0 && B02==1 && Bi12==0 && B21==0 && B11==1 && B01==0 ){
    S'=-B;
}
else{
    S'=0;
}
```

※ LT1 : CONSTANT(2)
LT2 : CONSTANT(4)
LT3 : CONSTANT(8)
LT4 : CONSTANT(16)

FIG. 21

| B32 | B22 | B12 | B02 | Bi12 | Bi22 | Bi32 |
|-----|-----|-----|-----|------|------|------|
| B31 | B21 | B11 | B01 | Bi11 | Bi21 | Bi31 |
| B30 | B20 |     |     |      |      |      |

PIXEL OF INTEREST

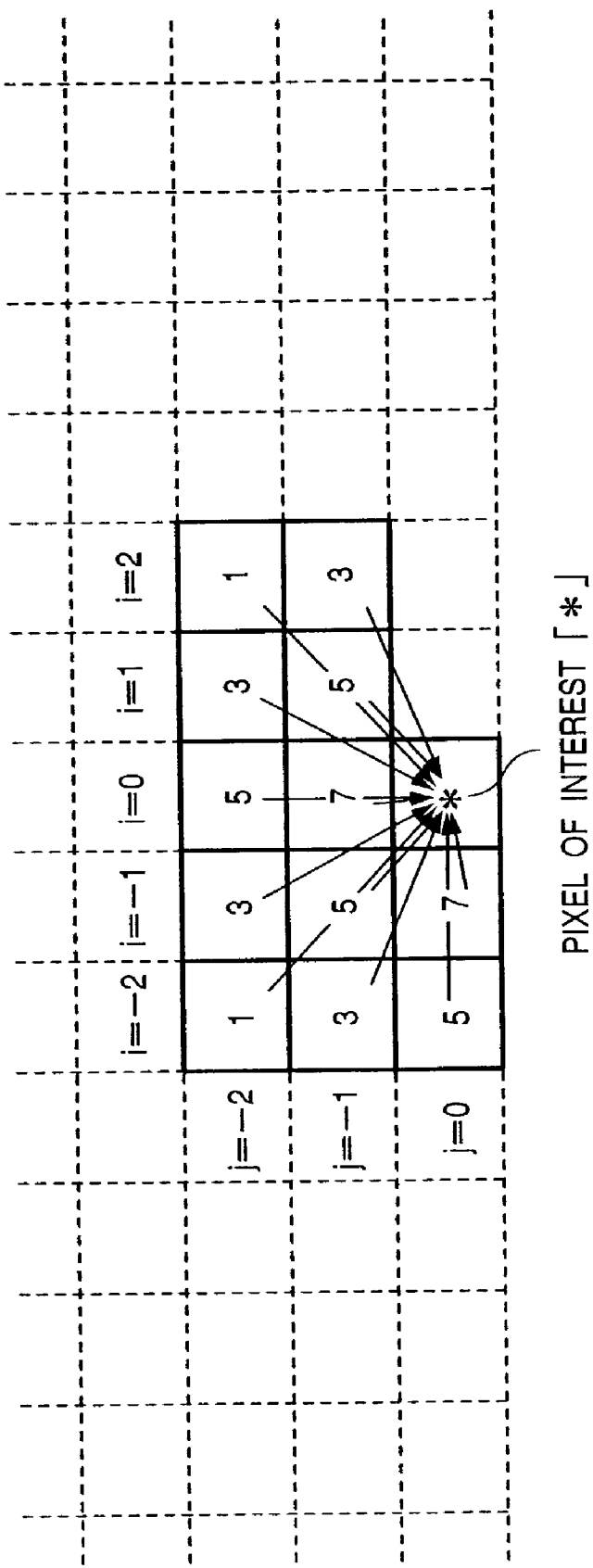

IMAGE PROCESSING APPARATUS AND ITS CONTROL METHOD

FIELD OF THE INVENTION

The present invention relates to an image processing apparatus for receiving N-bit multi-valued image information having density information, converting it into M-bit (N≧M) image information, and outputting the converted image information, and its control method and, more particularly, to an image processing apparatus which executes an image conversion process such as an average density preservation process, error diffusion process, minimized error process, or the like and its control method.

BACKGROUND OF THE INVENTION

Recent digital copying machines implement advanced functions by processing images as digital information. As functions other than those of a copying machine, such copying machine can also have a printer function by establishing connection to a network, a FAX function by establishing connection to a public line, and the like. For example, digital copying machines GP55F, GP215, and the like available from Canon inc. are known.

FIG. 1 shows an example of the arrangement of a digital copying machine, which is connected to a host computer (to be abbreviated as a "PC" hereinafter) via a network. Referring to FIG. 1, reference numeral 101 denotes a PC; and 103, a digital copying machine. The PC 101 and digital copying machine 103 are connected via a network cable 102. In the digital copying machine 103, reference numeral 104 denotes an image processor, which includes an image memory (page memory) 105.

The user launches so-called DTP (Desk Top Publishing) application software on the PC 101 and creates or edits various documents or figures. The created document or figure is converted into a page description language (PDL, e.g., PostScript available from Adobe Systems Incorporated), and is sent as image data to the copying machine 103 after it is rasterized. At this time, the image data is sent as RGB luminance data, and the copying machine 103 that has received the image data sometimes executes luminance-density conversion, an image conversion process, or the like in some cases. However, image data normally undergoes a luminance-density conversion process, image conversion process, or the like implemented by a software process of a driver on the PC 101, and is then sent.

Of course, when the PC 101 sends PDL data, since the PDL data must be rasterized to bitmap data, an external controller (not shown) is connected between the PC 101 and copying machine 103 to execute the aforementioned process.

However, the prior art suffers the following problem.

Normally, when the image conversion process is executed in the driver on the PC 101, since processes of an average density preservation method, error diffusion method, and the like impose heavy loads, much time is required to process the entire image, and the user must wait until a desired output is obtained.

SUMMARY OF THE INVENTION

The present invention has been made to solve the aforementioned problem, and has as its object to provide an image processing apparatus which can execute a high-speed image process by omitting some of image conversion processes that require heavy loads in accordance with the feature of an image to be processed, and its control method.

In order to achieve the above object, according to one aspect of the present invention, there is provided an image processing apparatus for receiving N-bit multi-valued image information having density information, converting the input image information into M-bit (N≧M) image information, and outputting the converted image information, comprising: generation means for generating information indicating whether or not an image conversion process is made for one line including a pixel of interest of the multi-valued image information, on the basis of the multi-valued image information; and control means for controlling to inhibit execution of the image conversion process for one line including the pixel of interest of the multi-valued image information in accordance with the generated information.

Also, according to one aspect of the present invention, there is provided a method of controlling an image forming apparatus which receives N-bit multi-valued image information having density information, converts the input image information into M-bit (N≧M) image information, and outputs the converted image information, comprising the steps of: generating information indicating whether or not an image conversion process is made for one line including a pixel of interest of the multi-valued image information, on the basis of the multi-valued image information; and controlling to inhibit execution of the image conversion process for one line including the pixel of interest of the multi-valued image information in accordance with the generated information.

According to one aspect of the present invention, there is provided a program for making a computer function as: generation means for generating information indicating whether or not an image conversion process is made for one line including a pixel of interest of multi-valued image information, on the basis of the multi-valued image information; and control means for controlling to inhibit execution of the image conversion process for one line including the pixel of interest of the multi-valued image information in accordance with the generated information.

According to one aspect of the present invention, there is provided a computer readable recording medium that records a program for making a computer function as: generation means for generating information indicating whether or not an image conversion process is made for one line including a pixel of interest of multi-valued image information, on the basis of the multi-valued image information; and control means for controlling to inhibit execution of the image conversion process for one line including the pixel of interest of the multi-valued image information in accordance with the generated information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 describes an arithmetic operation of an adder 810 shown in FIG. 8 using program language C;

FIG. 16 shows an example of coefficients used upon executing the average density calculation process;

FIG. 18 describes random number generation by the random number generator 806 using program language C;

FIG. 19 describes a hysteresis control value calculation process using program language C;

FIG. 20 describes a threshold value calculation process using program language C;

FIG. 21 shows a binarization result layout state (pattern);

FIG. 25 shows a collection method of collecting errors in contrast to the error diffusion method that diffuses errors described in the second embodiment.

DETAILED DESCRIPTION OF THE PREFERRED EMBODIMENTS

A preferred embodiment of the present invention will be described in detail hereinafter with reference to the accompanying drawings.

[Outline of Apparatus]

Figure 1:
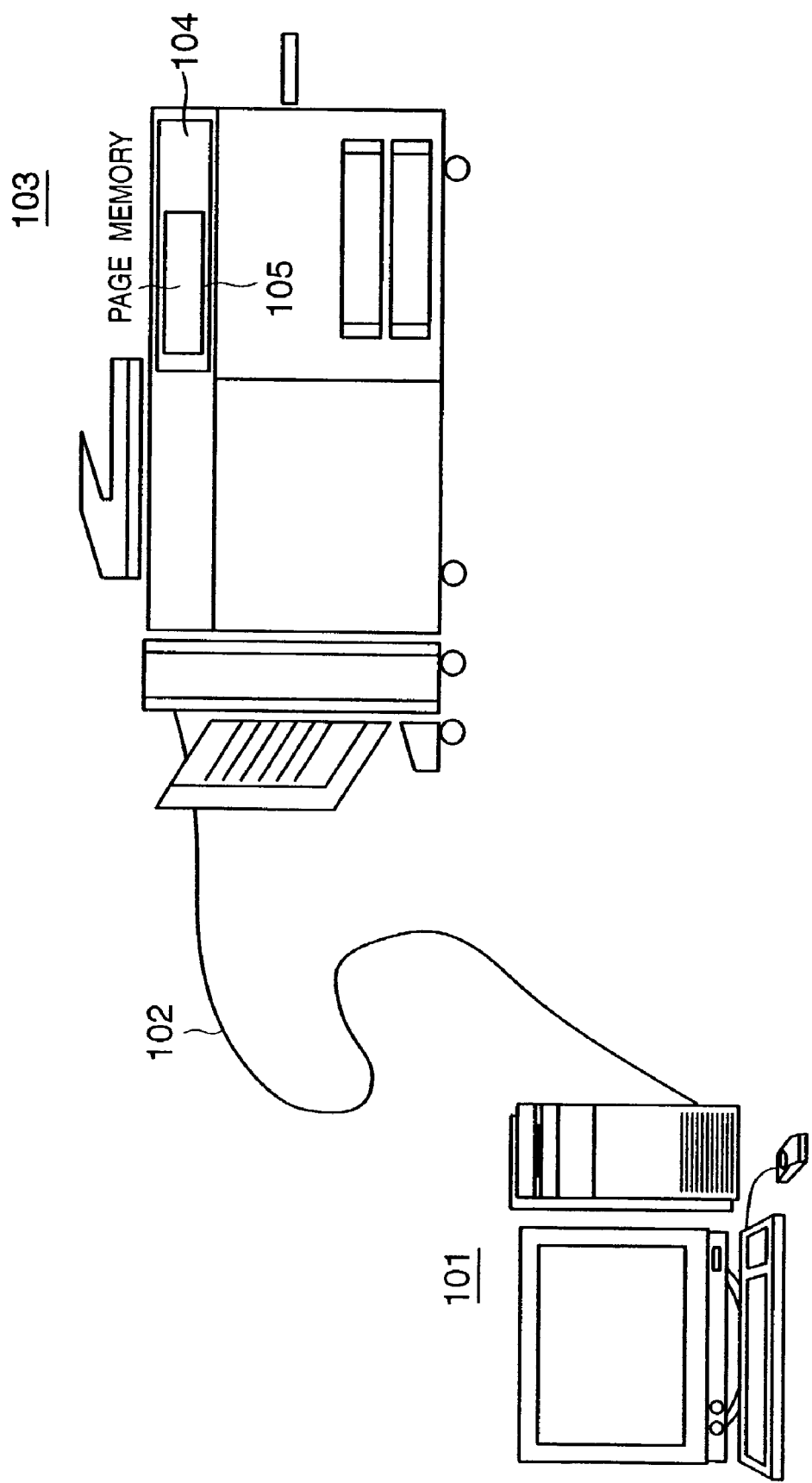
FIG. 1 shows an example of the arrangement of a digital copying machine connected to a host computer (PC) via a network.
Figure 2:
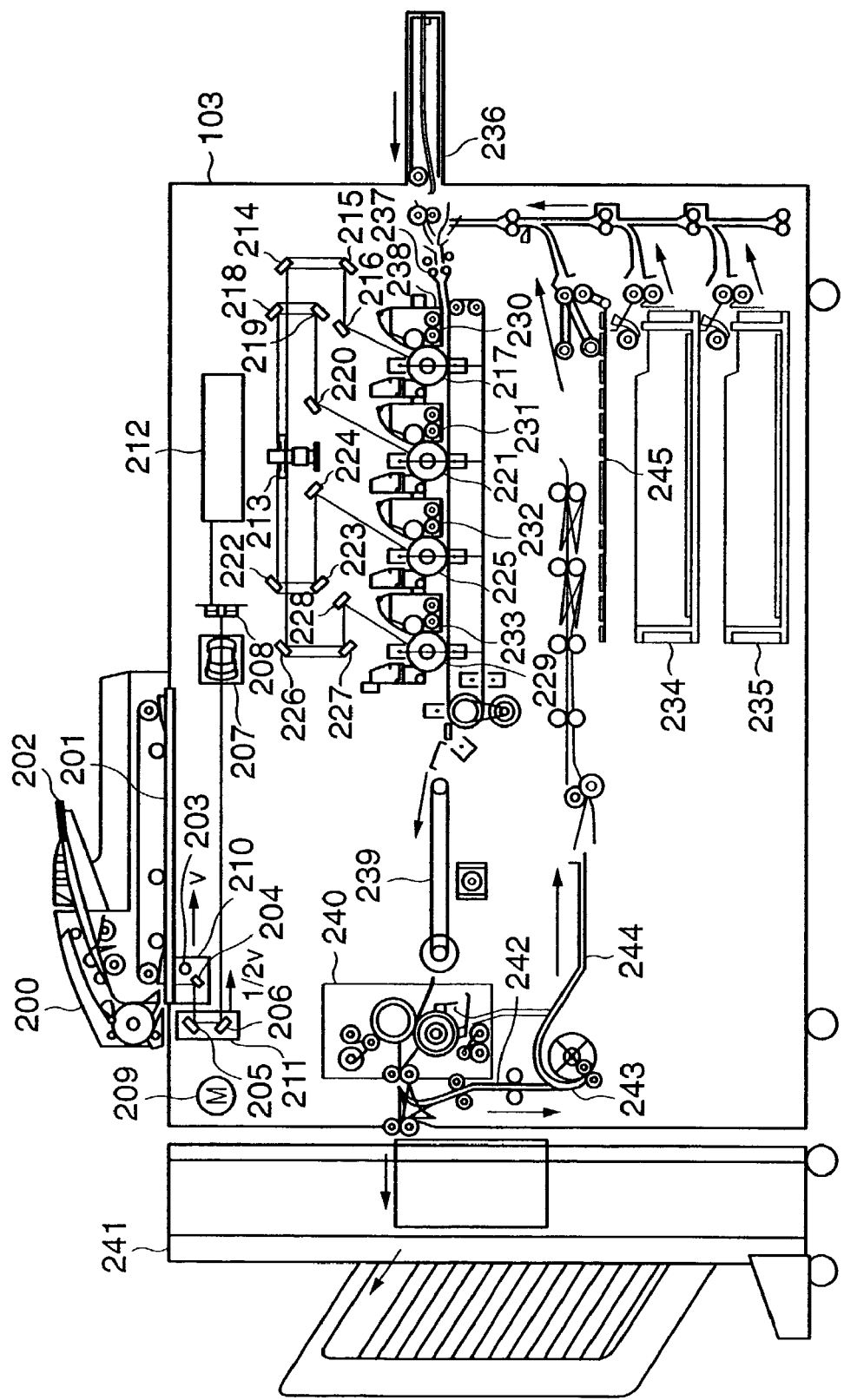
FIG. 2 is a sectional view showing the structure of a color copying machine according to an embodiment of the present invention.

FIG. 2 is a sectional view showing the structure of a color copying machine according to this embodiment. As a preferred embodiment, the present invention is applied to a full-color copying machine which forms C, M, Y, and K images on four photosensitive drums using laser beams in the following description. Also, the present invention can be applied to a full-color copying machine which forms C, M, Y, and K images in turn using a single photosensitive drum, a copying machine which forms a color image using three colors, i.e., C, M, and Y, a two-color copying machine, a monochrome copying machine, ink-jet or thermal head color and monochrome copying machines, and the like.

The color copying machine shown in FIG. 2 comprises an ADF 200 for feeding documents automatically picked up from a plurality of documents 202 to a document table 201 of a copying machine main body, and a sorter/stapler 241 for sorting and stapling printed sheets exhausted from the copying machine main body as option devices. Note that the ADF 200 can sequentially set the obverse and reverse faces of each document on the document table 201. Also, the detailed arrangements of the ADF 200 and sorter/stapler 241 are known to those who are skilled in the art, and a detailed description thereof will be omitted.

A document fed from a plurality of documents 202 set on the ADF 200 onto the document table 201 is illuminated with light coming from an illumination lamp 203. Light reflected by the document is guided by mirrors 204, 205, and 206, and reaches a CCD 208 via an optical system 207, thus forming an image on the CCD 208. Note that a mirror unit 210 includes the mirror 204 and illumination lamp 203, and is mechanically moved at velocity V by a motor 209 in a direction (i.e., sub-scan direction) perpendicular to the array of elements on the CCD 208. Also, a mirror unit 211 includes the mirrors 205 and 206, and is moved at velocity V/2 by the motor 209 in the sub-scan direction, thus scanning the entire surface of a document.

As will be described in detail later, an image processing circuit 212 electrically processes scanned image information, temporarily stores the information in an image memory, and then outputs the information as a print signal. Also, the image processing circuit 212 can receive image data from an external PC via a network cable 102 connected to the copying machine main body. The received data is temporarily stored in the image memory as in the scanned image information, and is then output as a print signal.

A print signal output from the image processing circuit 212 is sent to a laser driver (not shown) to drive four semiconductor laser elements (not shown). Four laser beams output from the four semiconductor laser elements are reflected by a polygonal mirror 213, and one of these lasers scans the surface of a photosensitive drum 217 via mirrors 214, 215, and 216. Likewise, the second laser beam scans the surface of a photosensitive drum 211 via mirrors 218, 219, and 220, the third laser beam scans the surface of a photosensitive drum 225 via mirrors 222, 223, and 224, and the fourth laser beam scans the surface of a photosensitive drum 229 via mirrors 226, 227, and 228.

An electrostatic latent image formed on the photosensitive drum 217 is developed by yellow (Y) toner supplied from a developer 230 to obtain a toner image. Likewise, electrostatic latent images formed on the photosensitive drums 221, 225, and 229 are developed by magenta (M), cyan (C), and black (K) toners supplied from developers 231, 232, and 233 to obtain corresponding toner images.

A print sheet fed from one of paper cassettes 234 and 235 and a manual insert tray 236 to an image forming unit is attracted by a transfer belt 238 via registration rollers 237, and is conveyed at velocity V. The toner images of respective colors are formed on the photosensitive drums 217, 221, 225, and 229 in synchronism with the supply & convey timing of the print sheet, and are transferred onto the conveyed print sheet. The print sheet on which the toner images of respective colors have been transferred is separated from the transfer belt 238, and is conveyed to a fixing device 240 by a conveyor belt 239. After the toner images are fixed on the print sheet by the fixing device 240, the print sheet is exhausted onto the sorter/stapler 241 in case of one-sided copy, or is fed to a two-sided path 242 in case of two-sided copy.

In case of two-sided copy, the print sheet which is fed to the two-sided path 242 is reversed by a reverse path 243, and is held on a two-sided tray 245 via a convey path 244. The print sheet held on the two-sided tray 245 is fed to the image forming unit again, and an image is formed on the obverse face of that print sheet in the same sequence as above. Then, the print sheet is exhausted onto the sorter/stapler 241.

[Flow of Image Signal]

The flow of image processes executed by the PC 101 and color copying machine 103 mentioned above will be explained below. The flow of image processes executed on the PC 101 side will be explained first.

Figure 3A:
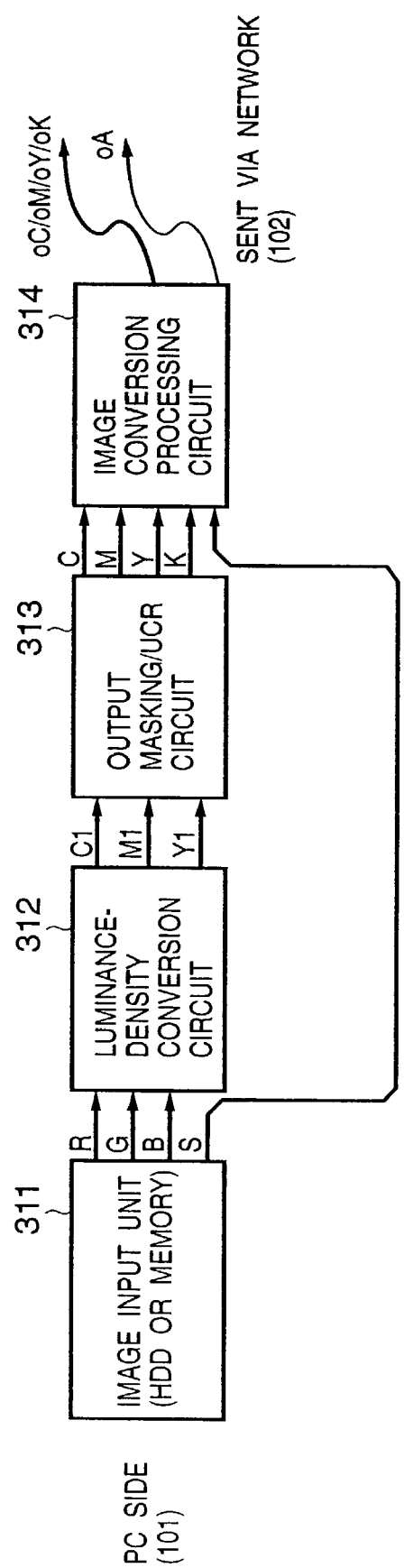
FIGS. 3A and 3B are block diagrams respectively showing image processes executed on the PC and copying machine sides.
Figure 3B:
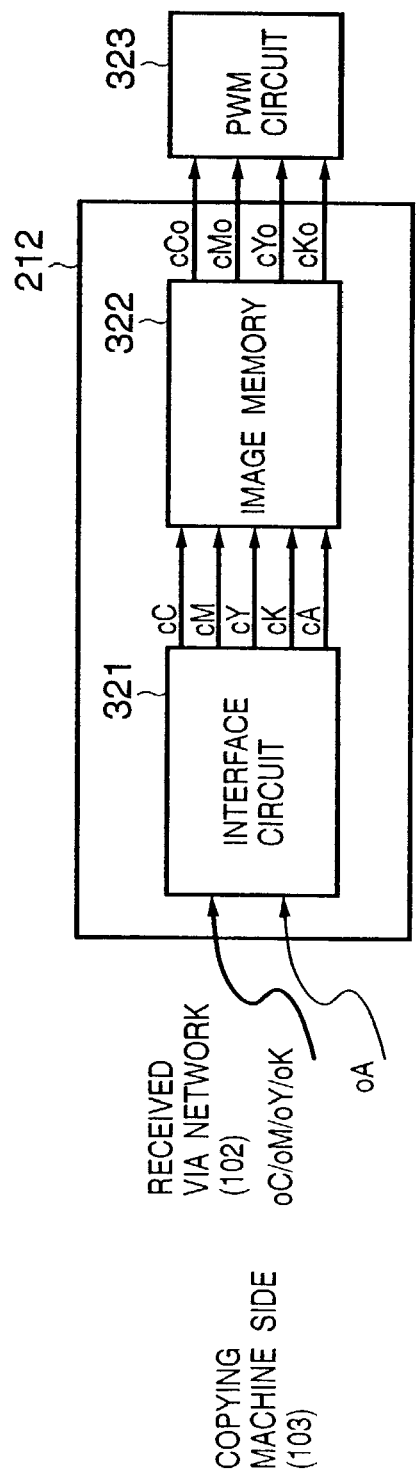

FIGS. 3A and 3B are block diagrams respectively showing image processes executed on the PC and copying machine sides. FIG. 3A is a block diagram showing image processes on the PC 101 side. On the PC 101, after the aforementioned creation/edit process using DTP application software, PDL data of the created/edited data is rasterized to generate R, G, and B image signals. These image signals are output to a luminance-density conversion circuit 312 for respective pixels. At this time, original image data is held in a hard disk drive (to be abbreviated as "HDD" hereinafter) or memory, and line information of a pixel of interest is simultaneously output as an S signal.

Figure 4:
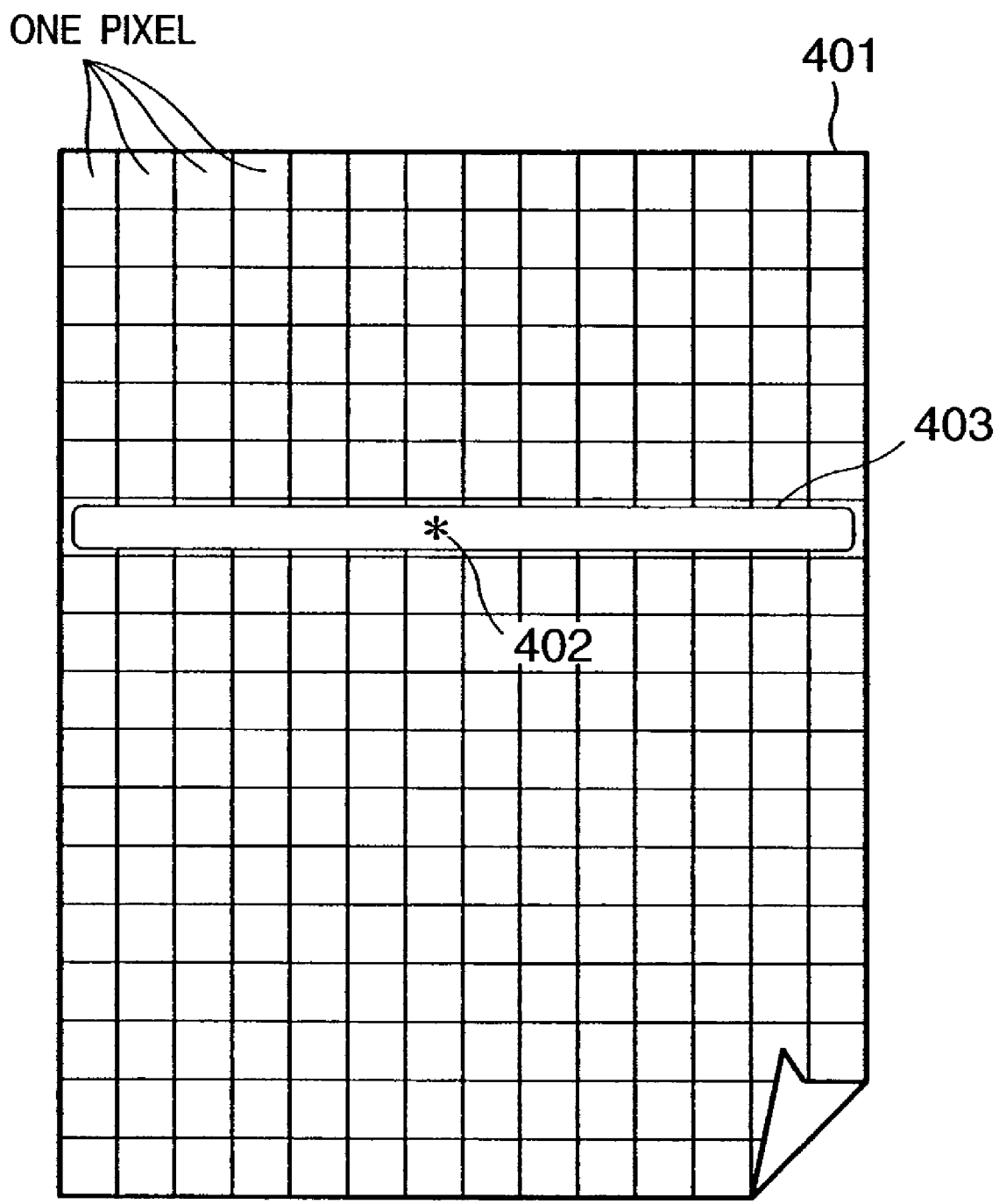
FIG. 4 is a view for explaining line information (S signal) of a line which includes the pixel of interest.

Note that this S signal is data indicating if data on a line that includes the pixel of interest are "all zeros" or "contains data other than zeros". For example, when pixels to be processed are arranged, as indicated by 401 shown in FIG. 4, if 402 indicates the pixel of interest, a hatched portion 403 on that line is indicated by the S signal as line information. If "data other than zeros" for at least one pixel is present on the line of the hatched portion 403, the S signal from an image input unit 311 changes to "1"; otherwise, i.e., if data on that line are "all zeros", the S signal changes to "0". Such discrimination may be implemented using adders, but is processed by a CPU (not shown) in this embodiment.

The luminance-density conversion circuit 312 is a lookup table comprising a RAM or ROM, and converts R, G, and B luminance signals output from the image input unit 311 into C, M, and Y density signals (cyan (C), magenta (M), and yellow (Y)) by:

$$C1 = -V \cdot \log(R/255)$$

$$M1 = -V \cdot \log(G/255)$$

$$Y1 = -V \cdot \log(B/255)$$

where the base of logarithm is 10, and V is a constant.

Referring back to FIG. 3A, an output masking/UCR circuit 313 converts C1, M1, and Y1 signals output from the luminance-density conversion circuit 312 into Y, M, C, and K signals as toner colors of the image forming apparatus by:

$$\begin{bmatrix} C \\ M \\ Y \\ K \end{bmatrix} = \begin{bmatrix} a_{11} & a_{21} & a_{31} & a_{41} \\ a_{12} & a_{22} & a_{32} & a_{42} \\ a_{13} & a_{23} & a_{33} & a_{43} \\ a_{14} & a_{24} & a_{34} & a_{44} \end{bmatrix} \begin{bmatrix} C1 \\ M1 \\ Y1 \\ K1 \end{bmatrix} \quad (1)$$

$$K1 = \min(C1, M1, Y1)$$

where a coefficient $a_{ij}$ ($i=1, 2, 3, 4, j=1, 2, 3, 4$) is a constant unique to the apparatus in consideration of various toner tincture characteristics.

An image conversion processing circuit 314 binarizes input multi-valued data by an average density preservation method (to be described later), and outputs binary data. In this case, colors C, M, Y, and K (cyan (C), magenta (M), yellow (Y), and black (K)) are independently processed, and the processing results are independently output as oC, oM, oY, and oK. As will be described in detail later, an operation skip signal oA is obtained from the S signal, and is output from the image conversion processing circuit 314 as in the above image signals.

The image signals oC, oM, oY, and oK, which have undergone the image processes on the PC 101 side, and the signal oA are sent to a printer (not shown) or the digital copying machine 103 via the network 102. At this time, the image signals to be sent may be compressed. In this case, the signals must be compressed using a compression format that allows expansion on the receiving side.

The flow of image processes executed on the color copying machine 103 side will be explained below using FIG. 3B.

An interface circuit 321 of the image processing circuit 212 receives signals sent from the PC 101 side via the network 102, and generates write address cA of C, M, Y, and K data cC, cM, cY, and cK in an image memory 322 so as to write C, M, Y, and K rasterized image on the image memory 322 for respective colors. Note that the image memory 322 includes a control circuit (not shown) provided around the memory. The control circuit controls to store image signals sent from the interface circuit 321 in desired areas on the image memory 322, and then outputs the image signals as cCo, cMo, cYo, and cKo to a pulse-width modulation (PWM) circuit 323.

[PWM Circuit]

The pulse-width modulation (PWM) circuit 323 shown in FIG. 3B will be described below.

Figure 5:
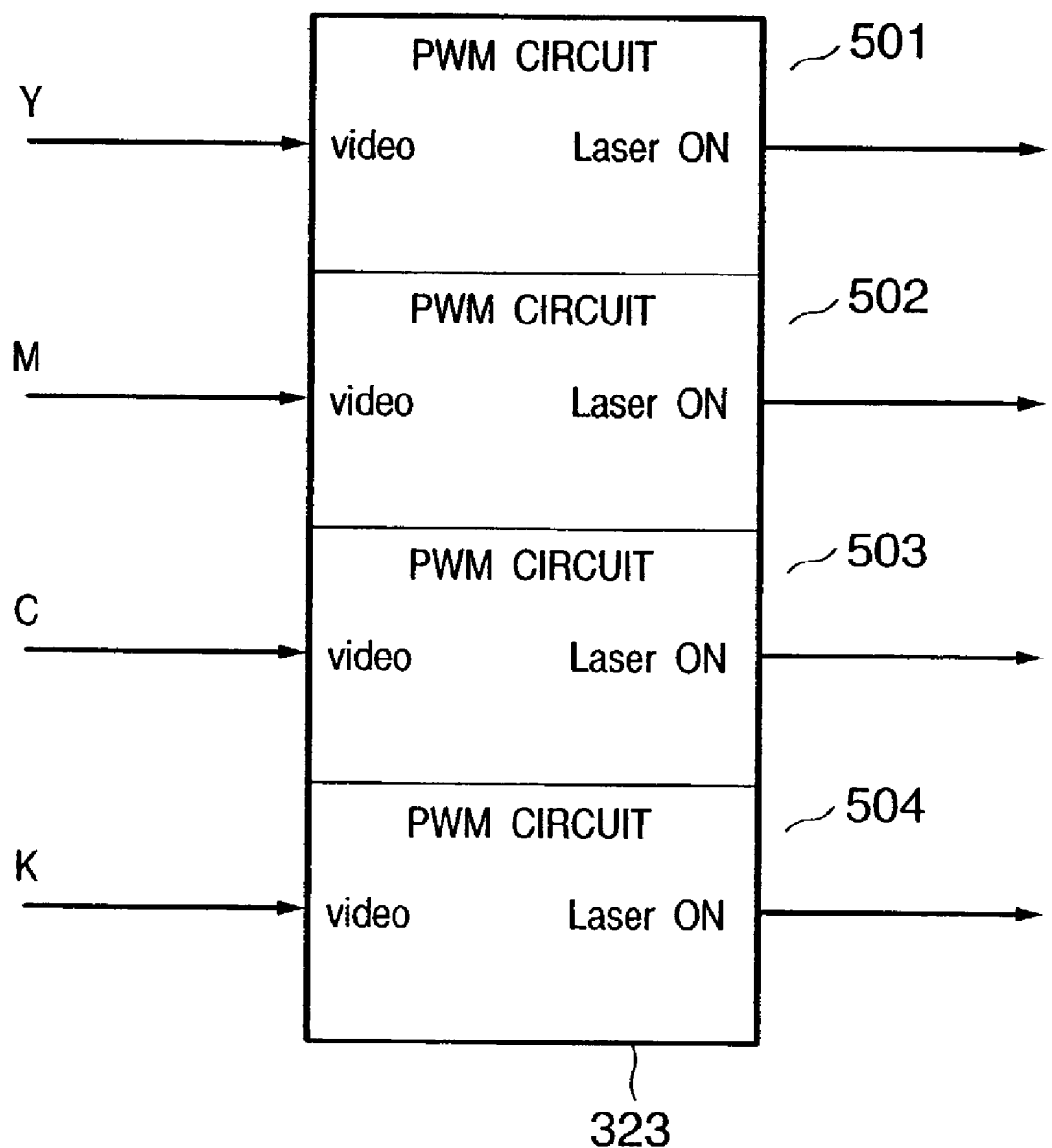
FIG. 5 is a diagram showing the arrangement of a PWM circuit in the embodiment of the present invention.

FIG. 5 shows the arrangement of the PWM circuit in this embodiment. The aforementioned image signals cCo cMo, cYo, and cKo are input to the PWM circuit 323, and are converted into analog signals. Referring to FIG. 5, reference numeral 501 denotes a yellow (Y) PWM circuit, which receives a yellow (Y) digital image signal, generates an analog signal for driving a yellow (Y) semiconductor laser element in accordance with the image signal, and sends the analog signal to a laser driver. Likewise, reference numeral 502 denotes a magenta (M) PWM circuit; 503, a cyan (C) PWM circuit; and 504, a black (K) PWM circuit. These PWM circuits receive digital image signals of corresponding color components, generate analog signals for driving semiconductor laser elements, and send them to the laser driver.

Figure 6:
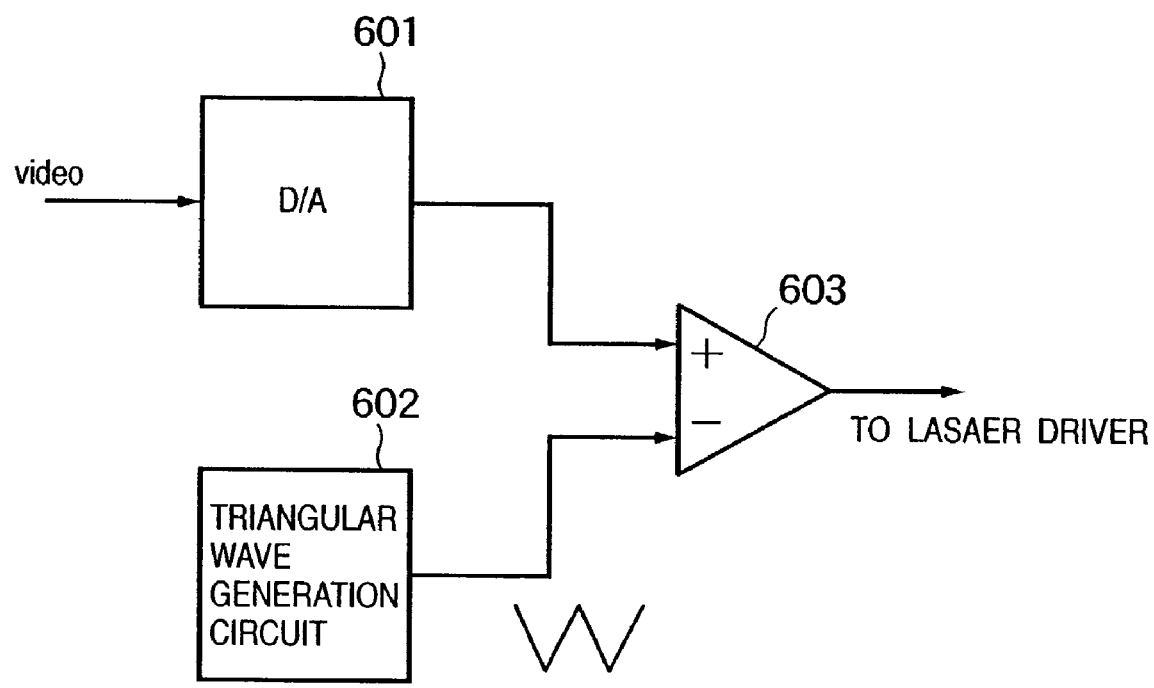
FIG. 6 is a block diagram showing an example of the arrangement of a PWM circuit for each color component.

FIG. 6 is a block diagram showing an example of the arrangement of the PWM circuit for each color component. Note that the PWM circuits have identical circuit arrangements irrespective of color components.

Referring to FIG. 6, reference numeral 601 denotes a D/A converter for converting an input digital image signal into an analog image signal. Reference numeral 602 denotes a triangular wave generator for generating a triangular wave for one pixel period. Reference numeral 603 denotes a comparator for comparing the analog image signal output from the D/A converter 601 and the triangular wave selected by the triangular wave generator 602. Then, a pulse-width modulated (PWM) pulse signal is output. This pulse signal is sent to the laser driver (not shown). In this embodiment, since a binary signal is output, PWM halftone data is basically not used. However, halftone data may be output in place of a full-dot size so as to adjust a dot system upon outputting binary data.

A high-definition output can be made by adjusting the dot system in this manner, while the solid black density lowers. This adjustment should be made depending on the ability of an output engine (printer).

Note that the period of the triangular wave is not limited to one pixel, but a 2-pixel period, 3-pixel period, or the like may be set in association with the resolution of the image forming unit.

Figure 7:
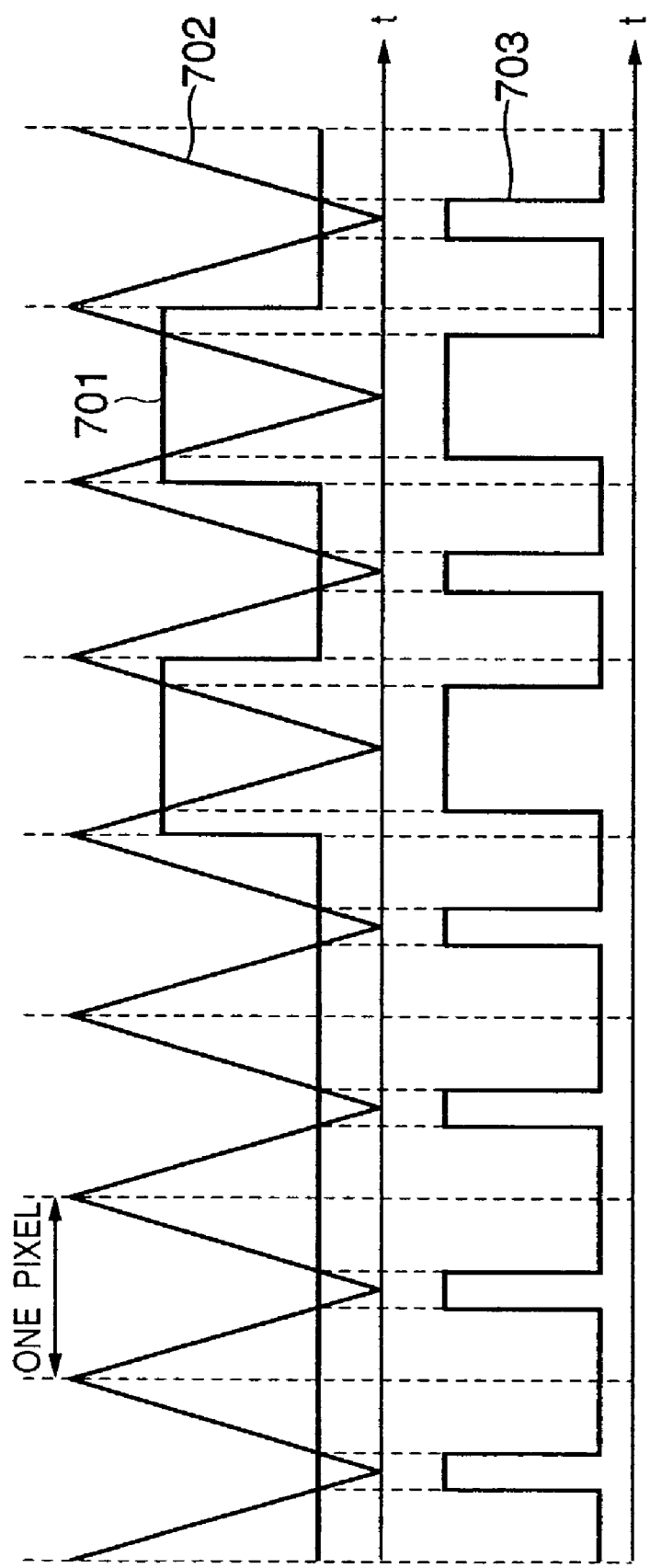
FIG. 7 is a timing chart in the PWM circuit.

FIG. 7 is a timing chart in the PWM circuit. As shown in FIG. 7, the comparator 603 compares an output 701 from the D/A converter 601 and a triangular wave 702 for one pixel period from the triangular wave generator 602, and outputs a pulse signal 703 as a comparison result.

After the aforementioned processes, an image to be printed on a print sheet is converted by an image conversion process (to be described below), and the print sheet is exhausted from the sorter/stapler 241, thus obtaining a desired output.

[First Embodiment]

An image conversion process according to the first embodiment, which is executed by the image conversion processing circuit 314 on the PC 101 side shown in FIG. 3A will be explained below.

Figure 8:
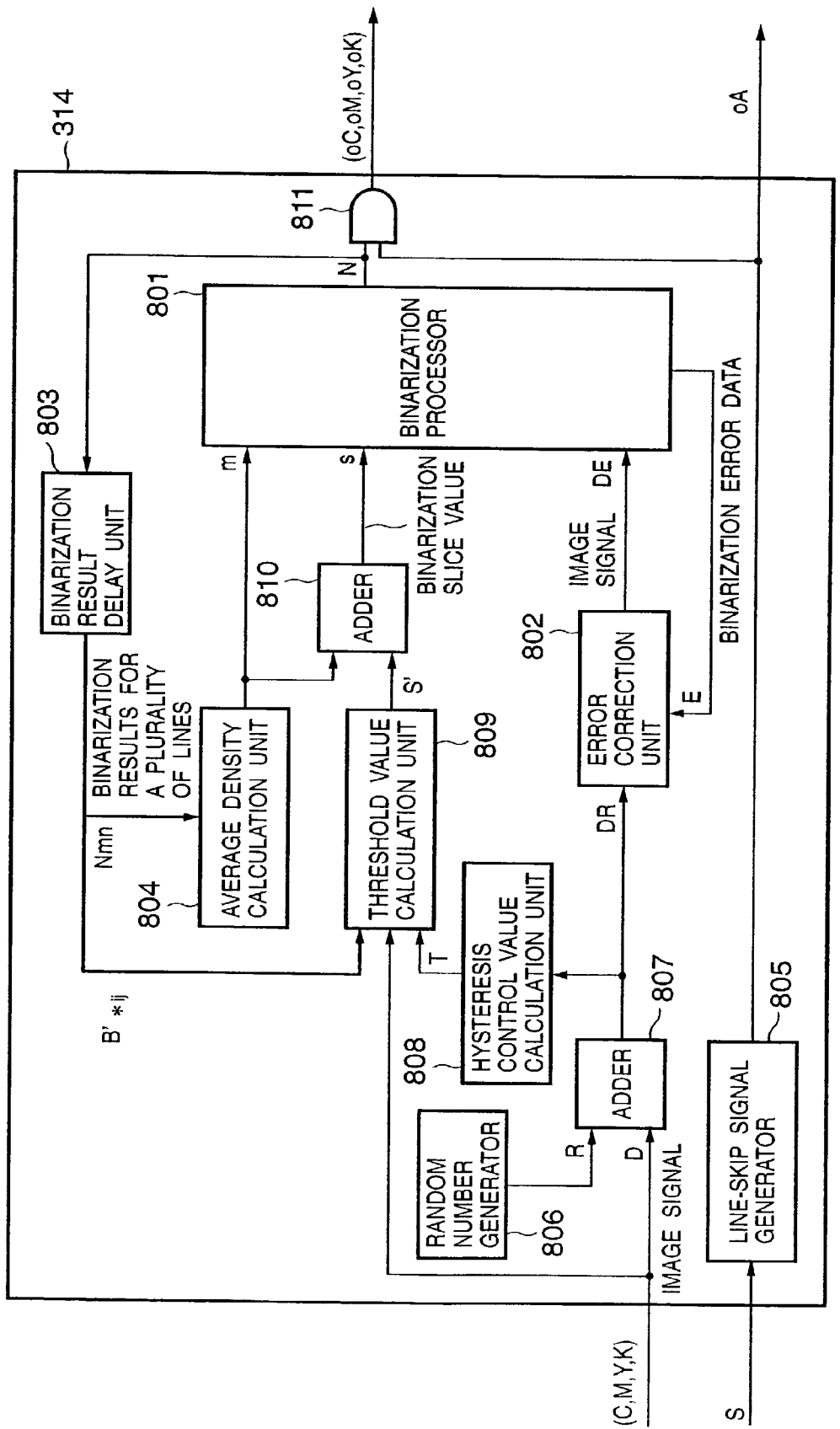
FIG. 8 is a block diagram showing the arrangement of an image conversion processing circuit in the first embodiment.

FIG. 8 is a block diagram showing the arrangement of the image conversion processing circuit according to the first embodiment. Prior to a description of points of the present invention, an image conversion processing method of the first embodiment will be described. This image conversion processing method is characterized in that image formation with stable image quality can be made on an arbitrary density region where image quality is not stable due to the influence of the printer characteristics.

Note that C, M, Y, and K image signals are independently processed, as described above, and only an arrangement for one color will be explained in this embodiment.

Referring to FIG. 8, reference numeral 802 denotes an error correction unit serving as error correction means, which receives a signal DR as the sum of an input image signal D (C, M, Y, K) and a random number (to be described later), and error data E generated by a binarization processor (to be described below), calculates an image signal DE that has undergone error correction, and outputs that signal to the binarization processor.

Reference numeral 801 denotes a binarization processor serving as binarization means, which receives the error-corrected image signal DE, a binarization slice value S (to be described later), and an average density calculation value m (to be described later), and obtains a binarization output N by comparing the image signal DE and binarization slice value S. Then, binarization error data E is calculated by a subtraction process between the image signal DE and average density calculation value m.

Reference numeral 803 denotes a binarization result delay unit serving as binarization result delay means, which receives the binarization output N, delays it a predetermined number of lines, and sends data as binarization results Nmn and B*ij for a plurality of lines to a threshold value calculation unit.

Reference numeral 804 denotes an average density calculation unit serving as average density calculation means, which receives the binarization results Nmn for a plurality of lines, makes product-sum operations using coefficients set in advance and the delayed binarization results, and outputs an average density calculation value m to the binarization processor 801 and an adder (to be described later).

Reference numeral 809 denotes a threshold value calculation unit serving as threshold value calculation means, which receives outputs B*ij of the binarization result delay unit 803 except for a result immediately before the pixel of interest, an output T from a hysteresis control value calculation unit (to be described later), and the input image signal D, calculates a binarization threshold value S' without referring to the (binarization) result immediately before the pixel of interest, and outputs that value to an adder (to be described below).

Reference numeral 810 denotes an adder serving as addition means, which receives the binarization threshold value S' calculated by the threshold value calculation unit 809, and the average density calculation value m from the average density calculation unit 804, and adds them to output a binarization slice value S. When the binarization threshold value S' is "255", the adder 810 outputs "255" as the binarization slice value S; otherwise, the adder 810 calculates S=S'+m, and outputs the result. FIG. 9 describes the above arithmetic operation using program language C.

Reference numeral 806 denotes a random number generator serving as random number generation means, which generates a random number of m-sequences ranging from −17 to +17, and outputs it to an adder (to be described below). Reference numeral 807 denotes an adder serving as addition means, which receive the random number from the random number generator 806 and the image signal D, and executes an addition process. Although not shown, a limiter process is done so that the sum DR falls within the range from 0 to 255.

Reference numeral 808 denotes a hysteresis control value calculation unit serving as hysteresis control value calculation means, which can make threshold value control according to the sum DR from the adder 807 by a method to be described later.

The detailed arrangements of the respective processing units shown in FIG. 8 will be described in turn.

Figure 10:
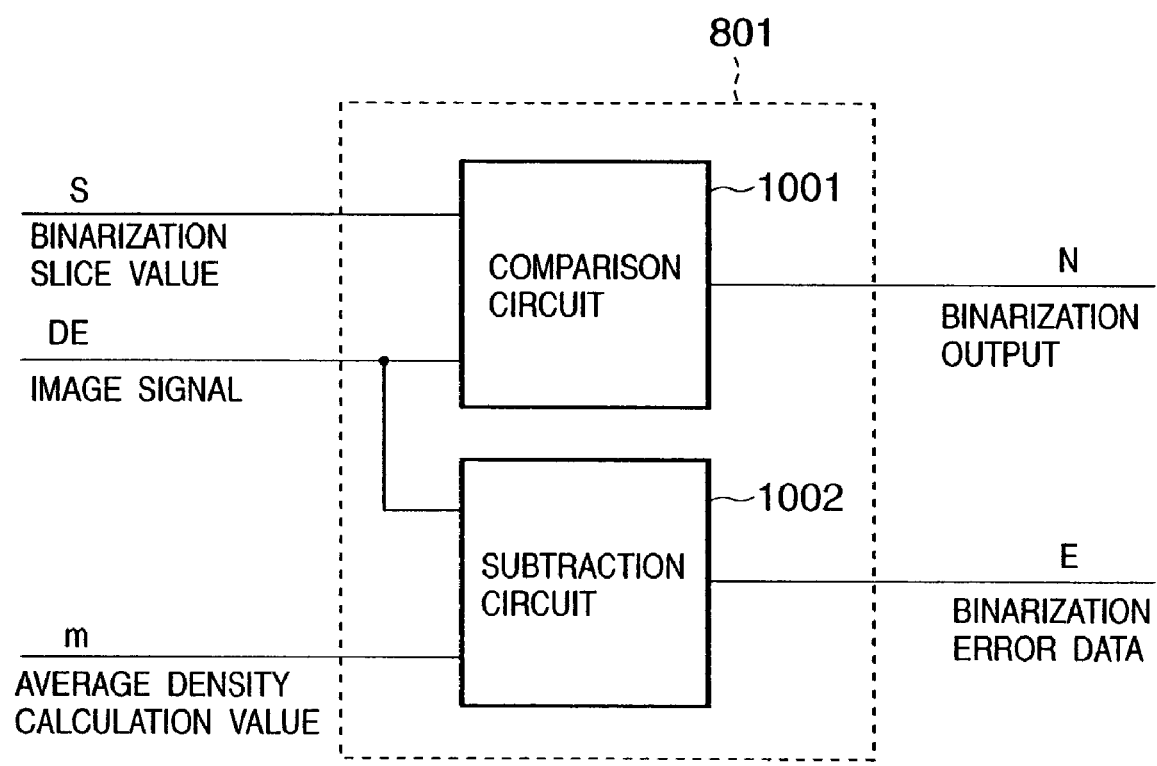
FIG. 10 is a block diagram showing the arrangement of a binarization processor 801 shown in FIG. 8.

The binarization processor 801 receives the aforementioned image signal DE, binarization slice value S, and average density calculation value m, and outputs a binarization output N and binarization error data E by comparing them. The binarization processor 801 has an arrangement shown in FIG. 10.

The input image signal DE is branched into two routes; one signal is input to a comparison circuit 1001, and the other signal is input to a subtraction circuit 1002. The comparison circuit 1001 compares the image signal DE and the binarization slice value S, and outputs a binarization output N as follows:

When $DE>S$, $N=1$

When $DE \leq S$, $N=0$

The subtraction circuit 1002 subtracts the average density calculation value m from the value of the image signal DE, and outputs the difference as binarization error data E.

$E=DE-m$

Figure 11:
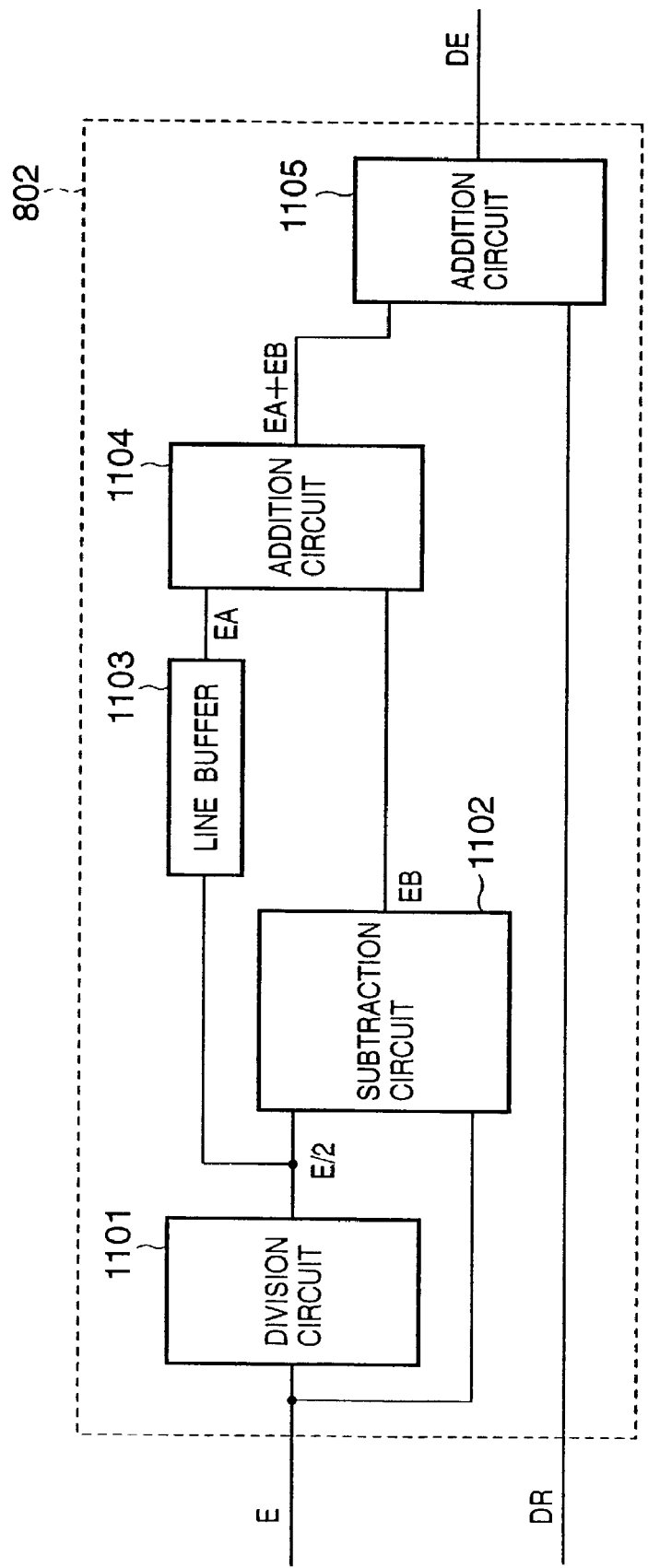
FIG. 11 is a block diagram showing the arrangement of an error correction unit 802 shown in FIG. 8.

The error correction unit 802 will be explained below. The error correction unit 802 calculates an error-corrected image signal DE by adding the binarization error data E to the image signal DR, and outputs it to the binarization processor 801. The error correction unit 802 has an arrangement shown in FIG. 11.

The input binarization error data E is halved by a division circuit 1101. The quotient is branched into two routes; one signal is input to a subtraction circuit 1102, and the other signal is input to a line buffer 1103.

The subtraction circuit 1102 calculates a difference EB (=E−E/2) between the binarization error data E and E/2 output from the division circuit 1101, and outputs that difference to an addition circuit 1104. The addition circuit 1104 calculates the sum of an output EA delayed one line by the line buffer 1103 for one line consisting of a plurality of bits (8 bits in this embodiment), and the output EB from the subtraction circuit 1102, and outputs the sum to an addition circuit 1105. The addition circuit 1105 calculates the sum of the image signal DR and the sum of EA delayed one line and EB, and outputs that sum as the image signal DE.

Figure 12:
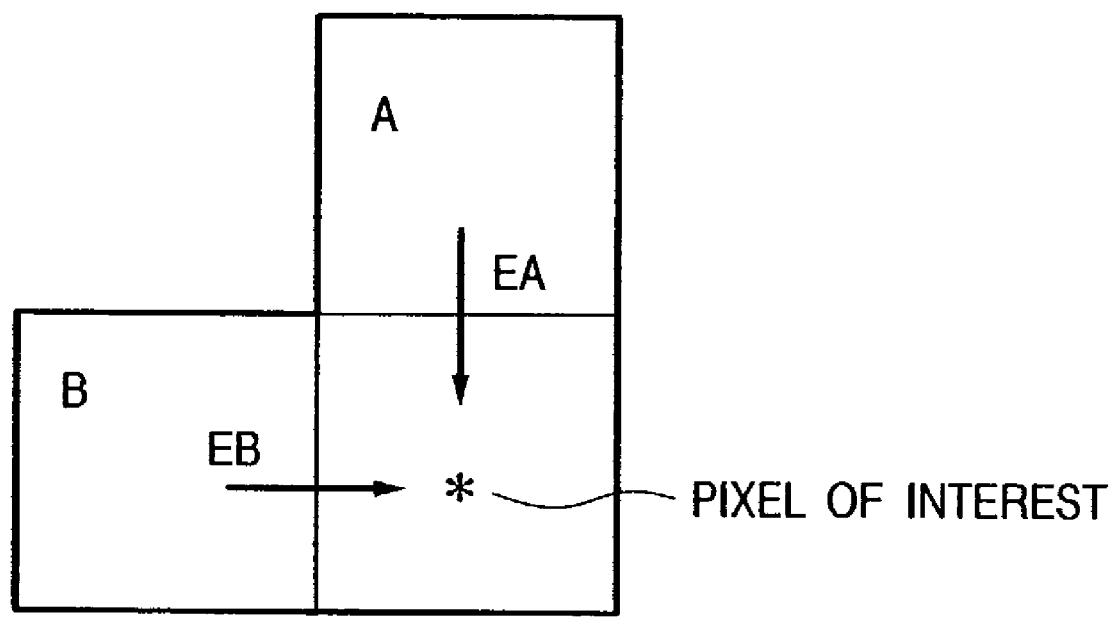
FIG. 12 is a view for explaining a process in the error correction unit 802.

That is, the error correction unit 802 executes a process for adding, to the pixel of interest "*", a binarization error EA obtained upon binarizing "A" on one line, and a binarization error EB obtained upon binarizing "B" one pixel before the pixel of interest, as shown in FIG. 12.

Figure 13:
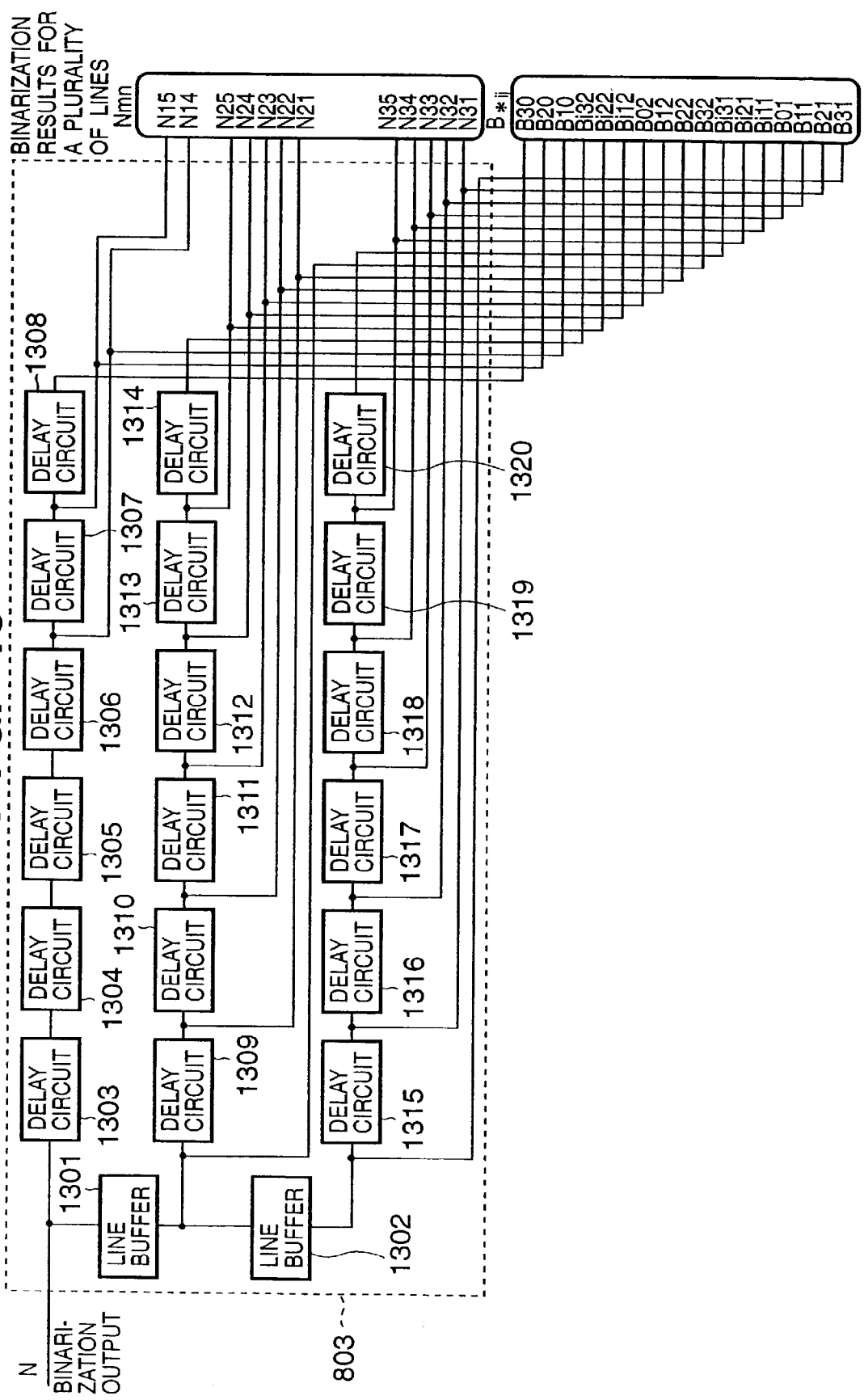
FIG. 13 is a block diagram showing the arrangement of a binarization result delay unit 803 shown in FIG. 8.

The binarization result delay unit 803 receives the binarization output N from the binarization processor 801, delays it a predetermined number of lines, and sends data as binarization results Nmn and B*ij for a plurality of lines to the average density calculation unit 804 and threshold value calculation unit 809. The binarization result delay unit 803 has an arrangement shown in FIG. 13.

The input binarization output N is sent from a line buffer 1301 that delays 1 bit for one line to a line buffer 1302 to delay data for respective lines. At the same time, data is delayed one pixel in turn by each of delay circuits 1303 to 1308. The outputs from the delay circuits 1306 and 1307 are respectively output as N14 and N15.

The binarization output N delayed one line by the line buffer 1301 is delayed by delay circuits 1309 to 1314, and the outputs from the delay circuits 1309 to 1313 are output as N21 to N25. The binarization output N delayed one more line by the line buffer 1302 is delayed by delay circuits 1315 to 1320, and the outputs from the delay circuits 1315 to 1319 are output as N31 to N35.

At the same time, the outputs from the delay circuits 1306 to 1308 are output as B10, B20, and B30, respectively. After the binarization output N delayed one line by the line buffer 1301 is delayed, it is output as B32 to B02 and Bi12 to Bi32. Also, after the binarization output N delayed one more line by the line buffer 1302 is delayed, it is output as B31 to B01 and Bi11 to Bi31.

Figure 14:
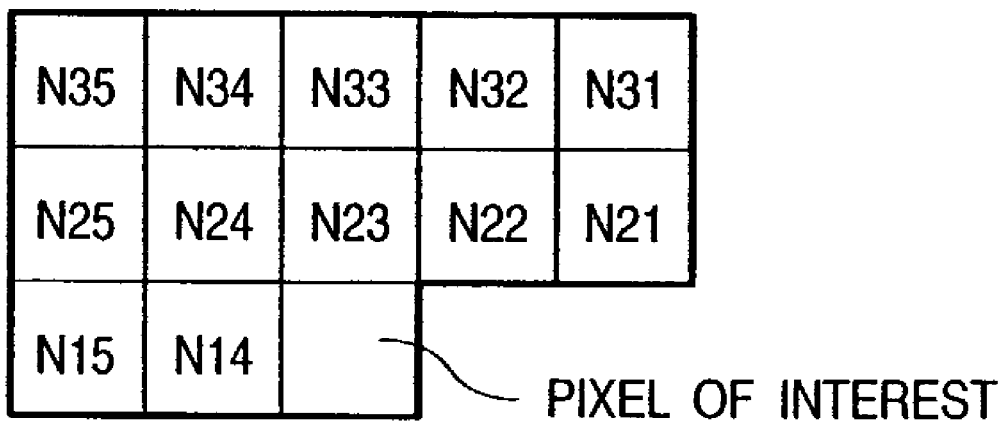
FIG. 14 shows binarization results Nmn for a plurality of lines by the binarization result delay unit 803.

That is, the average density calculation unit 804 receives data obtained by binarizing a two-dimensional image as binarization results Nmn for a plurality of lines in a state shown in FIG. 14 after that data has undergone delay processes for a plurality of lines and a plurality of pixels.

The average density calculation unit 804 receives the binarization results Nmn for a plurality of lines, makes product-sum operations using coefficients which are set in advance, and the delayed binarization results, and outputs an average density calculation value m, which are used in the binarization processor 801 and adder 806. The average density calculation unit 804 has an arrangement shown in FIG. 15.

Figure 15:
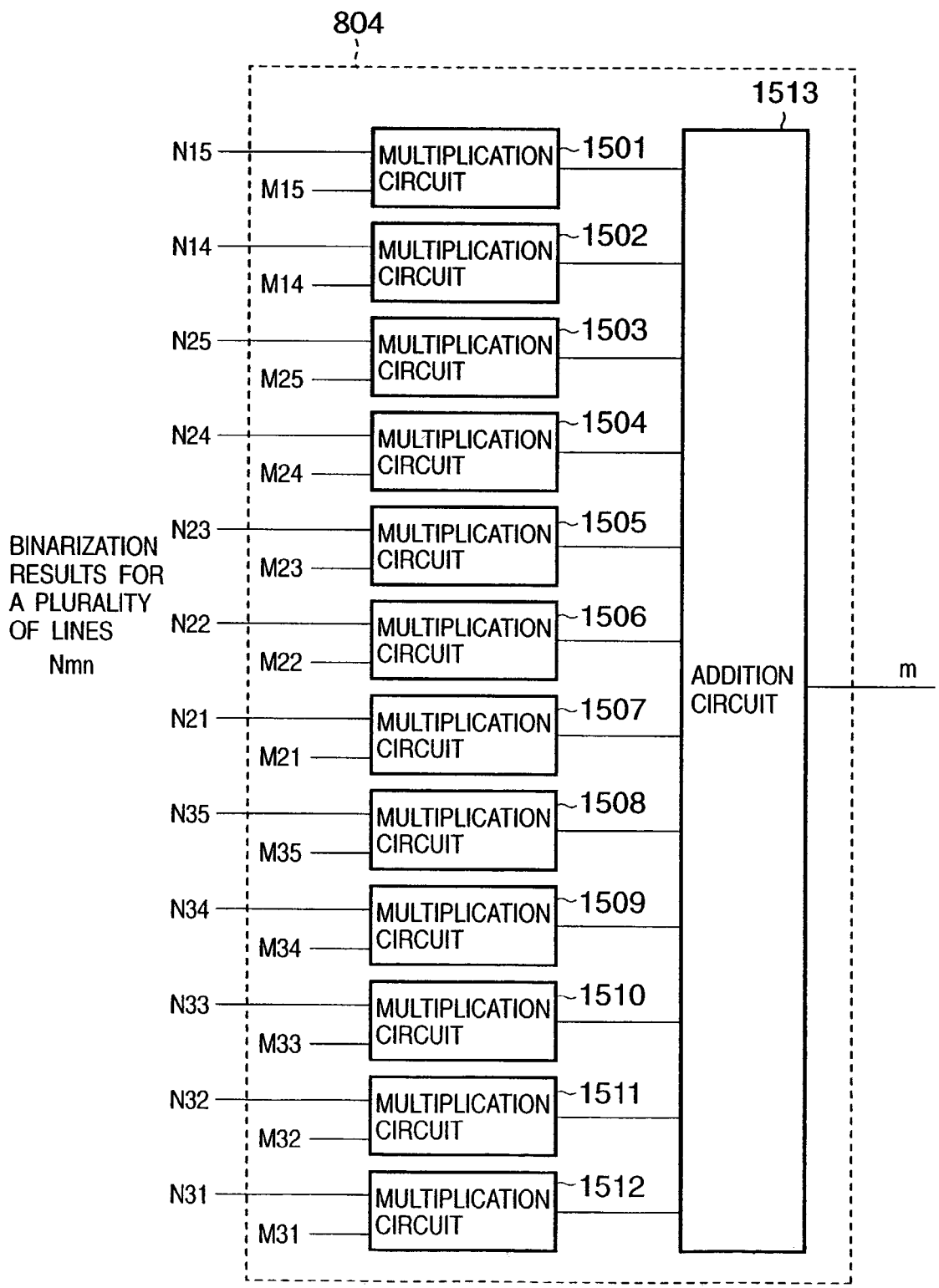
FIG. 15 is a block diagram showing the arrangement of an average density calculation unit 804 shown in FIG. 8.

A multiplication circuit 1501 shown in FIG. 15 receives a binarization output N15 and coefficient M15 and outputs their product. A multiplication circuit 1502 receives a binarization output N14 and coefficient M14 and outputs their product. Likewise, multiplication circuits 1503 to 1512 make such arithmetic operations, and these products are added by an addition circuit 1513. The sum is output as the average density calculation value m. FIG. 16 shows an example of coefficients used upon executing the average density calculation process.

Figure 17:
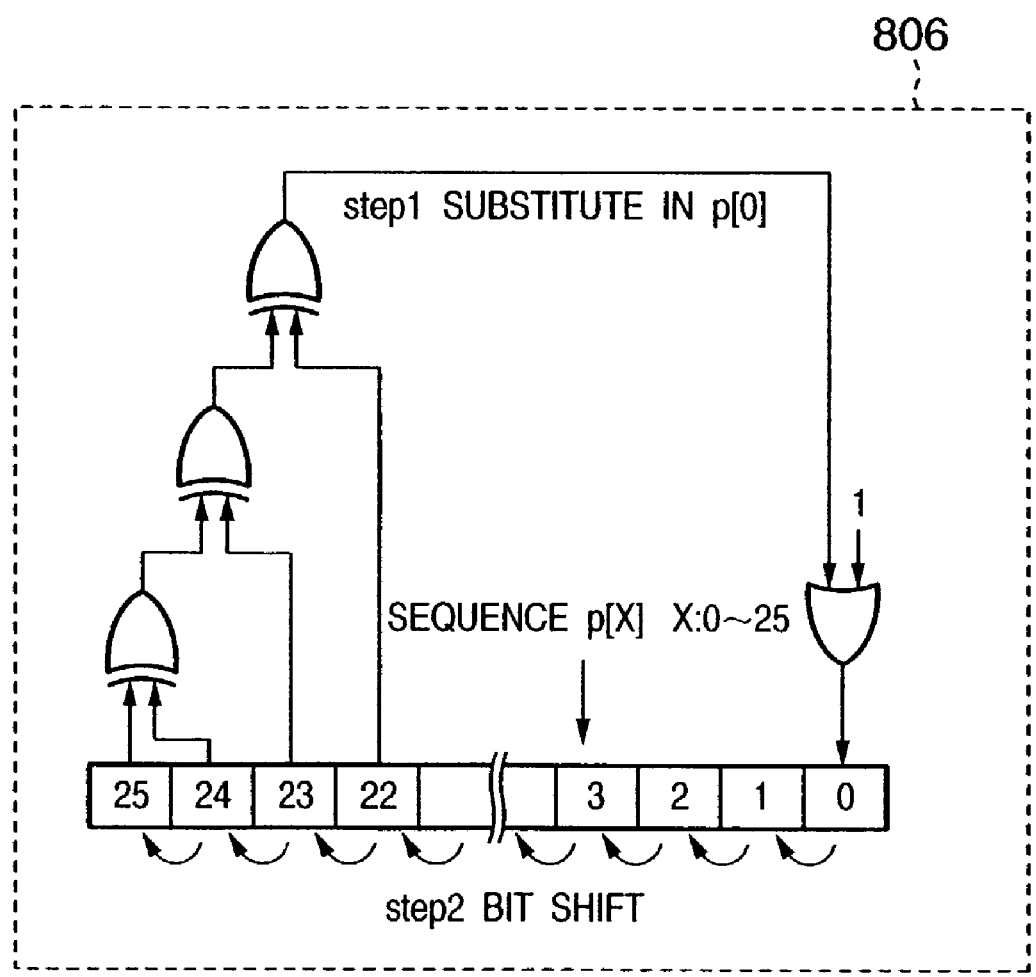
FIG. 17 is a diagram showing the arrangement of a random number generator 806 shown in FIG. 8.

The random number generator 806 as a processing unit for generating a random number R will be explained below. Note that this embodiment uses a shift register code-sequence generator of m-sequences, as shown in FIG. 17. If N represents the number of stages of a shift register used, a pseudo random number having 2N−1 as a period can be easily generated by simple hardware. With this arrangement, a 1-bit shift register having 25 stages is used to prevent periodicity from appearing even upon processing an A3 document at 400 dpi.

FIG. 17 shows the arrangement of the random number generator 806. FIG. 18 describes random number generation by the random number generator 806 using program language C. A description will be given using FIG. 18 for the sake of convenience.

As initialization, "0" is written in registers p[ii]: ($0 \leq ii \leq 25$), and "1" is set in register P[12] alone. Before outputting a random number value, an arithmetic operation $$p[0]=((p[25]\hat{\ }p[24]\hat{\ }p[23]\hat{\ }p[22])\&1)$$

is made for each pixel, and a random number value ranging from −17 to +17 is generated by:

$$\text{Random number}=(1-2*p[22])*(((p[15]*64+p[16]\\*32+p[17]*16+p[18]*8+p[19]*4+p[20]*2+p\\[21])*17)/128)$$

In this embodiment, a random number ranging from −17 to 17 is used. Alternatively, the random number generator may be modified to calculate:

$$\text{Random number}=(1-2*p[2])*(p[18]*8+p[19]*4+p\\[20]*2+p[21])$$

so as to output a random number value ranging from −15 to 15, thus obtaining the same effect.

Of course, it is possible to set a random number value to be zero. However, in order to attain natural texture control by changing the binarization slice value, data added with an arbitrary random number is preferably used.

The adder 807 adds the random number R generated by the random number generator 806 and the input image signal D.

$$DR=D+R$$

if (DR>255) {DR=255;} if (DR<0) {DR=0;}

Note that a limiter is applied so that the sum falls within the range from "0" to "255" (not shown).

The hysteresis control value calculation unit 808 will be described below with reference to FIG. 19. The hysteresis control value calculation unit 808 outputs a hysteresis control signal T by changing the value of a constant ALF (=32) in accordance with the input signal DR. That is, texture control in an arbitrary density region can be implemented in this manner.

FIG. 19 describes the hysteresis control value calculation process using program language C. If the input signal DR is equal to or smaller than a constant LR1 (=16), a process for setting II to be "0" is made; if the input signal DR is larger than the constant LR1 and is equal to or smaller than a constant LR2 (=48), II is calculated by:

$$II=((DR-LR1)*(ALF*256/(LR2-LR1)))/256$$

With this arithmetic operation, as the value of the input signal DR increases from the constant LR1 to the constant LR2, the value II gradually approaches from "0" to the constant ALF (=32).

On the other hand, if the input signal DR is larger than the constant LR2 and is equal to or smaller than a constant LR3 (=233), II is output as the constant ALF. If the input signal DR is larger than the constant LR3 and is equal to or smaller than a constant LR4 (=255), II is calculated by:

$$II=ALF-((DR-LR3)*(ALF*256/(LR4-LR3)))/256$$

This indicates that the output II approaches from the constant ALF to "0" as the value of the input signal DR increases from LR3 to the constant LR4.

On the other hand, if the input signal DR is larger than LR4, a process for setting II to be "0" is made.

After the above process, the difference calculated by subtracting a constant ALFm (=16) from II is output as an output signal T. The purpose of this subtraction is to change the signal T of the hysteresis control value calculation unit 808 from a negative value to a positive value. In this manner, texture control in an arbitrary density range can be controlled within a broad latitude range.

The threshold value calculation unit 809 will be described below. FIG. 20 describes a threshold value calculation process using program language C.

The threshold value calculation unit 809 divides the value of the signal T input from the hysteresis control value calculation unit 808 by constants LT1 (=2), LT2 (=4), LT3 (=8), and LT4 (=16) to obtain variables A (=T/LT1), B (=T/LT2), C (=T/LT3), and D (=T/LT4) to be used inside the unit.

By a method to be described later, the value of the binarization threshold value S' is controlled using variables A, B, C, and D and a constant in accordance with the binarization result layout state (pattern) of outputs B*ij from the binarization result delay unit 803. Since the output m from the average density calculation unit 804 is not used, the arithmetic operation in the threshold value calculation unit 809 can start before the arithmetic result of the average density calculation unit 804 is obtained.

FIG. 21 shows the binarization result layout state (pattern). All these results are previous binarization results, and are characterized in that they do not refer to a pixel immediately before the pixel of interest.

An actual process for controlling the binarization threshold value S' in accordance with the binarization result layout (pattern) will be explained below.

If the binarization state around the pixel of interest is described by:

B32==0&&B22==1&&B12==0&&B21==0&&B11==1&&B01==0 or
Bi12==0&&Bi22==1&&Bi32==0&&B01==0&&Bi11==1&&Bi21==0 the binarization threshold value S' is forcibly set to be a max constant "255", and is output. This is to forcibly make dots harder to print.

If the binarization state around the pixel of interest is described by:

B12==0&&B02==0&&Bi12==0&&Bi22==0&&Bi32==0&&
B11==0&&B01==0&&Bi11==1&&Bi21==0&&Bi31==0&&B20==0 and input value data D is smaller than 31 (31 of 0 to 255), the binarization threshold value S' is forcibly set to be a max constant "255", and is output. This is also to forcibly make dots hard to print if the above condition is met.

On the other hand, if the input multi-valued data D is equal to or larger than 31 (31 of 0 to 255) under the above condition, the binarization threshold value S' is set to be "0" and is output. This is to inhibit texture control if the previous binarization results form a specific layout (pattern). Of course, the constant "31" is not a fixed value but a parameter, and can be set to be another value such as "48", 64", or the like.

At this time, if the constant is set to be larger than "31", texture control becomes easier to apply; if the constant is set to be smaller than "31", texture control becomes harder to apply.

If the binarization state around the pixel of interest is described by:
B02==0&&Bi12==0&&B11==0&&B01==1&&Bi11==1&&Bi21==0&&B20==0 the binarization threshold value S' is set to be negative variable A (S'=−A), and is output.

This is to forcibly make dots easier to print if the above condition is met. In this case as well, the process is made without referring to a binarization result immediately before the pixel of interest.

Likewise, the binarization threshold value S' is controlled using internal variables A, B, C, and D and a constant in accordance with respective binarization result patterns without referring to the result immediately before the pixel of interest. As a result, if the calculated hysteresis control value T is positive, the control is made to make dots easier to print; if the calculated hysteresis control value T is negative, the control is made to make dots harder to print. In other words, the control is made to concentrate dots.

When the aforementioned process is sequentially done for respective pixels, texture can be controlled to an arbitrary pattern in an arbitrary density region in accordance with the calculated hysteresis control value T and the output values B*ij of the binarization result delay means.

The binarization threshold value S' obtained in this way is input to the adder 810 together with the output m of the average density calculation unit 804, and undergoes an addition process. If the binarization threshold value S' is "255", the binarization slice value S="255" is output; otherwise, the binarization slice value S is output by calculating S=S'+m. FIG. 9 describes the aforementioned arithmetic operation using program language C.

As described above, the image conversion processing method according to this embodiment can attain image formation which can stabilize image quality in a density region where image quality cannot be stable due to the influence of the printer characteristics. For example, even in a printer output which looks noisy since one pixel cannot be stably output, the image conversion processing method of this embodiment can improve such noisy appearance.

However, when the aforementioned processes are executed by the driver on the PC 101 side, the processing load is heavy, and much time is required.

Hence, this embodiment realizes high-speed processes by adding a line-skip signal generator 805 (FIG. 8) which serves as line-skip signal generation means. Speeding up of the aforementioned image conversion process as a point of this embodiment will be described below.

Normally, a blank portion makes up most of image data created on the PC 101 side. Especially, a blank portion makes up most of a photo+document format normally used in an office. Hence, in this embodiment, the processes that impose a heavy load are skipped for a blank portion, and "0" is output as a processing result. Whether or not a portion of interest is a blank portion is determined using the S signal from the aforementioned image input unit 311.

Normally, in a screen process such as simple binarization, dither, or the like, when it is determined that an input image signal is "0", i.e., blank, an output result can be immediately replaced by "0". In this manner, a high-speed process can be realized without any special process.

However, such simple replacement cannot be made in the processes of the aforementioned image conversion processing method. This is because the previous binarization results are internally referred to, as has been explained in the paragraphs of the average density calculation unit 804. Therefore, even if an input image signal is "0", it is impossible to immediately abort the image conversion process that imposes a heavy load, and to replace its output by "0".

When an input image signal is "0", if the internal arithmetic operation is simply aborted, and its output is replaced by "0", the average density can no longer be preserved in a portion where the previous binarization results are referred to, and texture disturbance and nonuniform low or high density portions appear.

Figure 22:
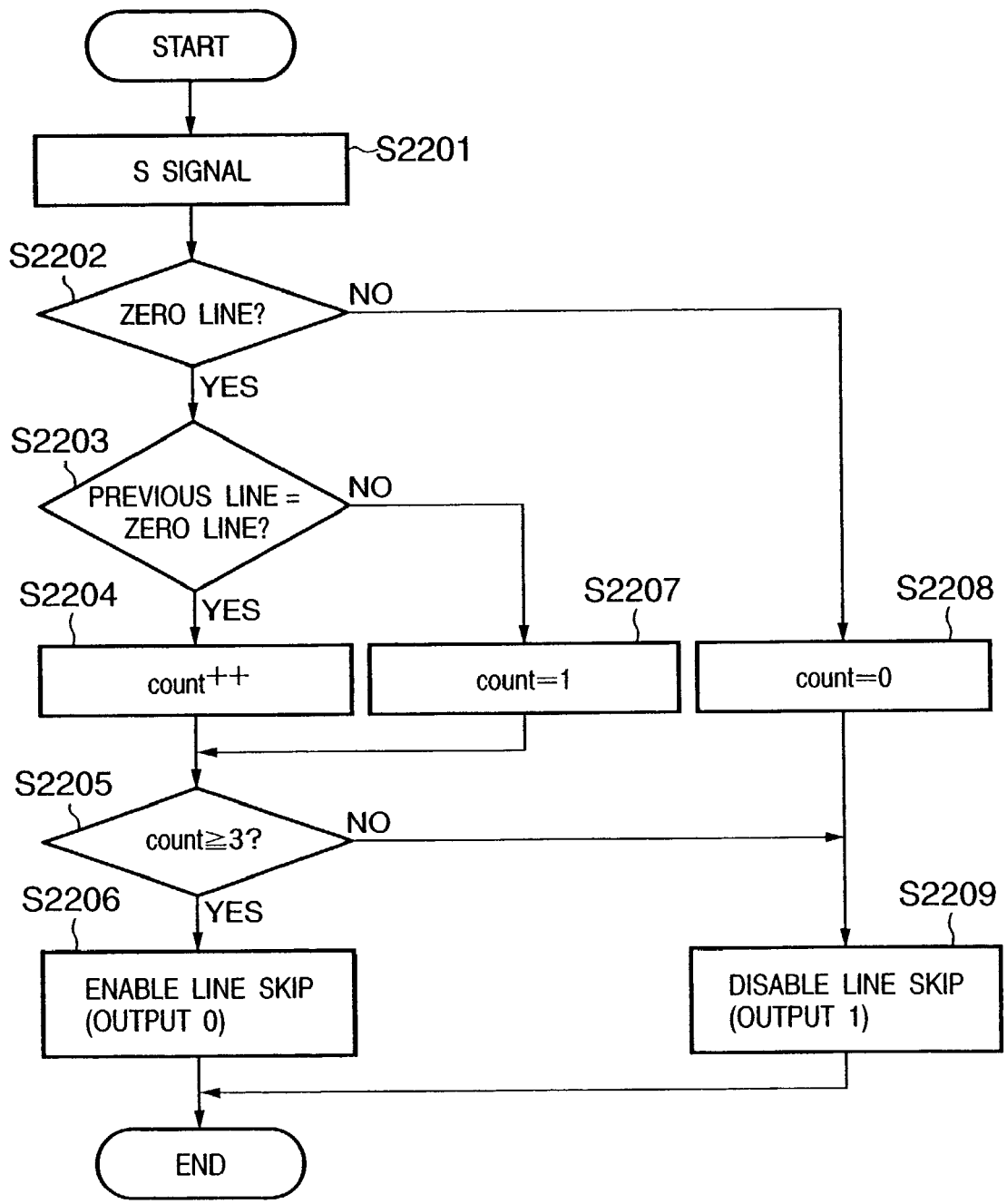
FIG. 22 is a flow chart showing the processing sequence of a line-skip signal generator 805.

FIG. 22 is a flow chart showing the processing sequence of the line-skip signal generator 805. The S signal of the line of interest obtained from the image input unit 311 is input in step S2201, and it is checked in step S2202 if the S signal is zero. If NO in step S2202, the flow advances to step S2208, and a parameter count is set to be "0" to execute a normal output process. After that, the flow advances to step S2209, and a control signal "1" is output to declare "cancel line skip".

On the other hand, if it is determined in step S2202 that the S signal is zero, the flow advances to step S2203 to check the held result of the previous line (one line immediately above the pixel of interest). Note that this embodiment comprises a memory for holding the result of the S signal for the previous line.

If the S signal of the previous line is also zero, it is determined that two zero lines successively appear, and the flow advances to step S2204 to increment the parameter count by "1". If the S signal of the previous line is not zero, the flow advances to step S2207 to set the parameter count to be "1". The value of the parameter count is checked in step S2205. If count ≧3, it is determined that three or more blank lines successively appear, and a control signal "0" is output in step S2206 to declare "execute line skip". On the other hand, if the value of the parameter count is not equal to or larger than 3, the flow advances to step S2209 to declare "cancel line skip".

The control signal output from the line-skip signal generator 805 is ANDed with the binarization output N from the binarization processor 801 by an AND gate 811, and the AND is output from the image conversion processing circuit 314.

When the control signal from the line-skip signal generator 805 is "0", the output from the image conversion processing circuit 314 is also "0" irrespective of the AND process.

In this embodiment, when the output result of the line-skip signal generator 805 is "0", the CPU is inhibited from executing an image conversion process (binarization process) that imposes a heavy load, a result which is not determined, and the signal from the line-skip signal generator 805 are ANDed. In this way, even when the CPU aborts a process that requires a heavy load, a correct output result can be obtained.

A point of the above description is that the determination is made using "the number of lines of processing results to be referred to by this image conversion process+1". That is, in this embodiment, since a reference region is formed by two lines, as shown in FIG. 16, the value of the parameter count used to check if this process can be skipped is 3 by adding "1" to the number of lines. Hence, only when three or more blank lines continuously appear, a blank image can be determined, and the process that requires a heavy load can be skipped.

Of course, when the previous processing results to be referred to by the average density preservation processing method are those for n lines, the image conversion process can be skipped only when (n+1) or more blank lines continuously appear. At this time, the threshold value of the parameter count in step S2204 shown in FIG. 22 is n+1.

The threshold value of this parameter count is not limited to n+1, but the same effect can be obtained if it is equal to or larger than n+1.

As described above, in a process for executing image conversion with reference to the pixel of interest and its surrounding pixels, the image conversion process can be appropriately skipped based on the line-skip signal while suppressing texture disturbance and density nonuniformity in a pseudo halftone process and, hence, a high-speed image conversion process can be realized. As a result, another process can be made in place of the skipped image conversion process, and image data sent from the PC can be output at high speed from a printer or digital copying machine.

[Second Embodiment]

The second embodiment of the present invention will be described in detail below with reference to the accompanying drawings.

The same reference numerals in the basic apparatus arrangement in the second embodiment denote the same parts as in the first embodiment, and a description thereof will be omitted. A characteristic feature of the second embodiment lies in that the average density preservation processing method used in the image conversion processing circuit 314 of the first embodiment is replaced by a general error diffusion processing method.

Since the basic arrangement except for the image conversion processing circuit is the same as that in the first embodiment, only differences will be explained.

Figure 23A:
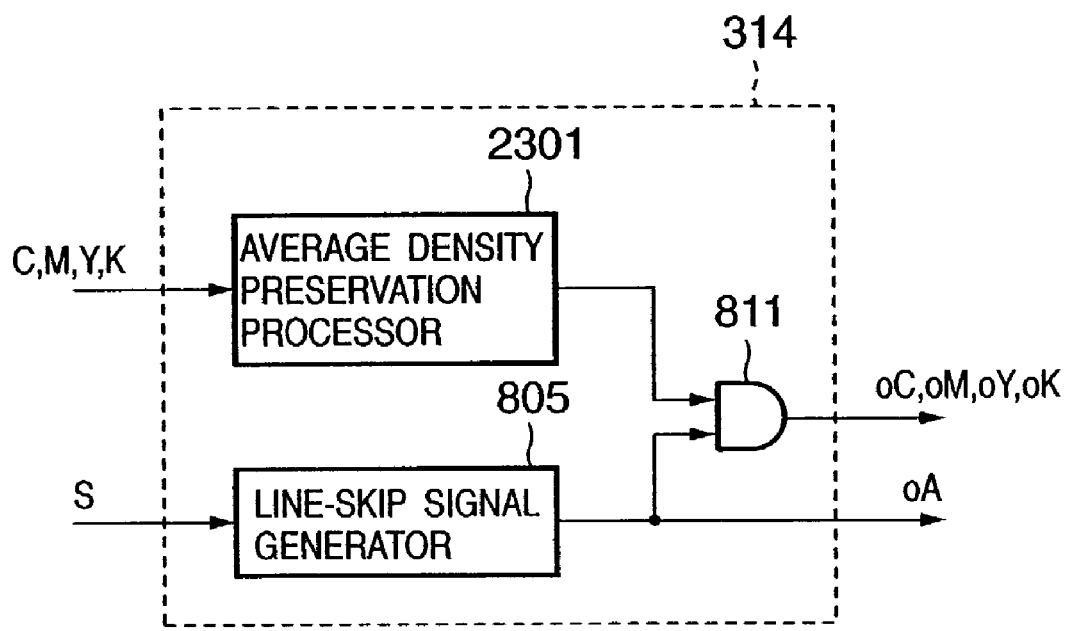
FIGS. 23A and 23B show the differences between the arrangements of the image conversion processing circuits of the first and second embodiments.
Figure 23B:
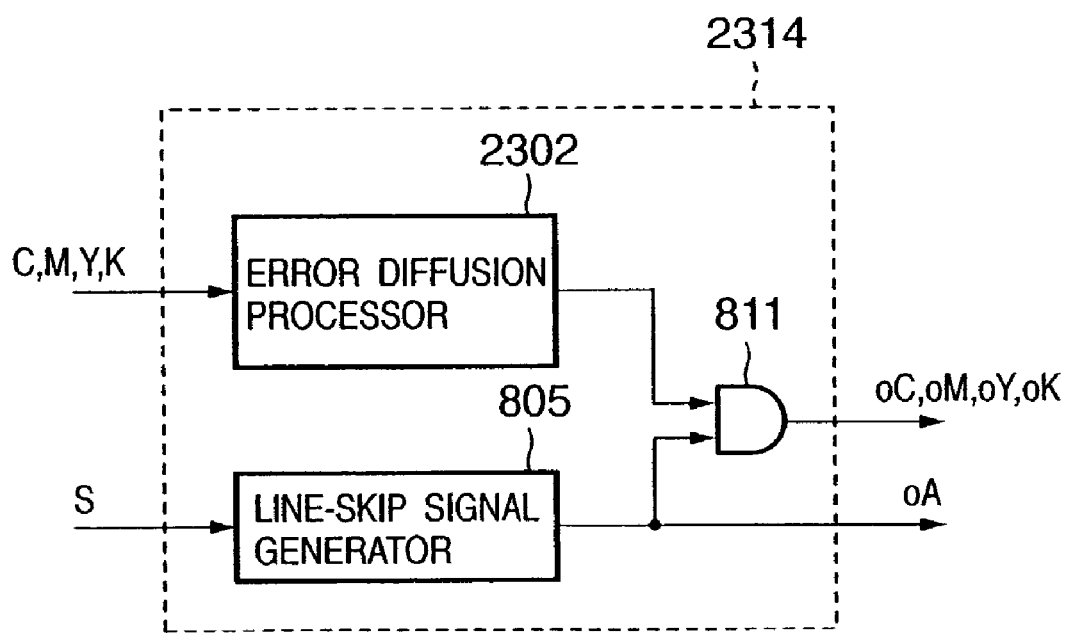

FIGS. 23A and 23B show the difference between the arrangements of the image conversion processing circuits of the first and second embodiments. FIG. 23A is a block diagram showing the basic arrangement of the image conversion processing circuit 314 described in the first embodiment, which corresponds to the arrangement shown in FIG. 8. FIG. 23A illustrates an arrangement excluding the line-skip signal generator 805 and AND gate 811 shown in FIG. 8 as an average density preservation processor 2301.

On the other hand, FIG. 23B is a block diagram showing the basic arrangement of the second embodiment. Note that the line-skip signal generator 805 as the point of the first embodiment has the same arrangement as that described in the first embodiment, and a description thereof will be omitted. Also, since an error diffusion processor 2302, which is different from the first embodiment, is technically known to those who are skilled in the art, a detailed description thereof will be omitted. However, a point of this embodiment will be explained below.

Figure 24:
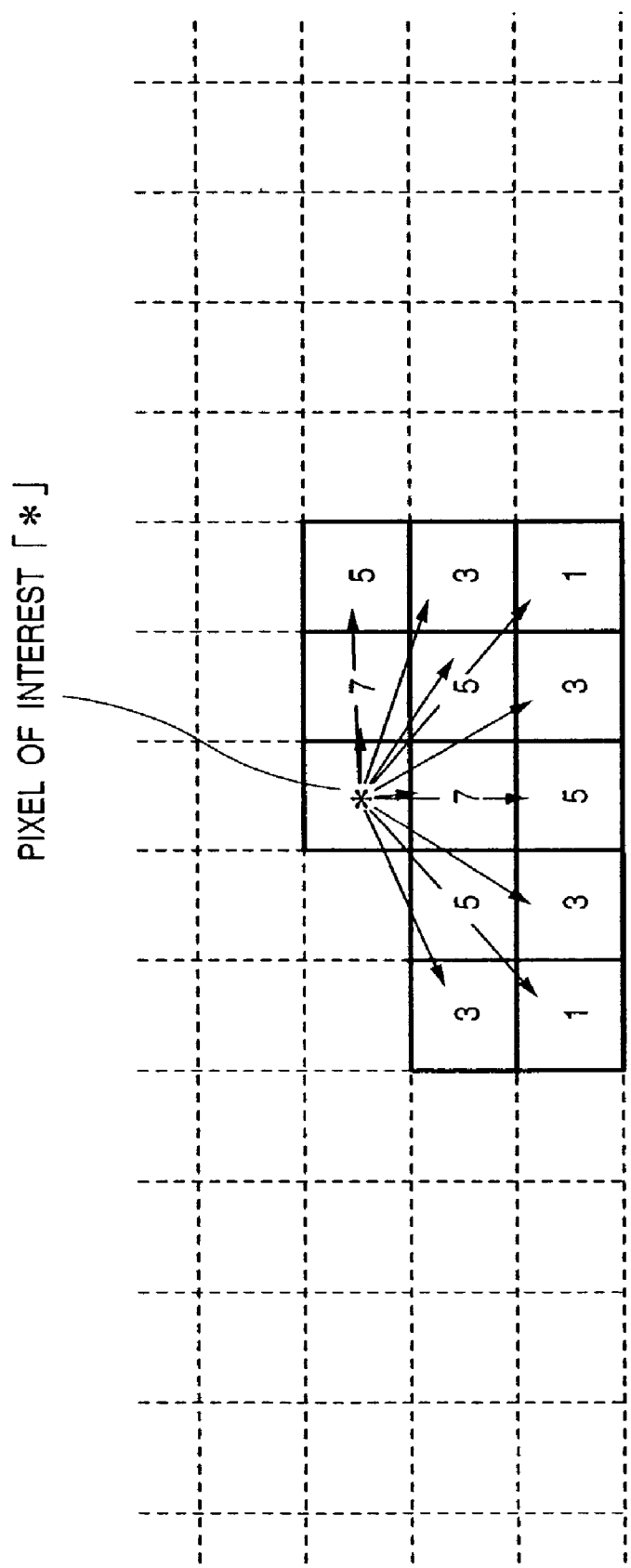
FIG. 24 shows a process for diffusing errors generated upon binarization using an error diffusion processing method.

FIG. 24 shows a process for diffusing errors generated upon binarization by the error diffusion processing method. In FIG. 24, "*" indicates the position of a pixel of interest, and numerical values around "*" are error diffusion coefficients. For example, assume that an input image signal is "191" and a binary output is "255". A binarization error generated at that time is 64 (=255−191). In this case, an error value "9" is diffused to the right neighboring pixel position of the pixel of interest. The breakdown of this value is 64×7÷(7+5+3+5+7+5+3+1+3+5+3+1)=9. Likewise, an error value "6" (=64×5÷(7+5+3+5+7+5+3+1+3+5+3+1)) is diffused to its neighboring pixel position. Also, error values are diffused to other pixels positions at a ratio given by:

64×n÷(7+5+3+5+7+5+3+1+3+5+3+1)

where n is the error diffusion coefficient shown in FIG. 24.

The aforementioned error diffusion processing method does not refer to any previous processing results since it diffuses errors to pixels before processing. This is a major difference from the first embodiment. However, in this case, several lines from the line of the pixel of interest must undergo arithmetic operations for respective pixels. This is because since several lines from the pixel of interest have undergone error diffusion, even if an input image signal is "0", the error-corrected pixel value may not be "0". Hence, even when an input image signal is "0", the binarization output result must not be immediately replaced by "0".

For this reason, the present invention can be applied to the error diffusion processing method of the second embodiment. In the second embodiment, since error values are diffused up to two lines ahead of the pixel of interest, whether or not line skip is made is checked by the process shown in FIG. 22 as in the first embodiment. Since the process after whether or not line skip is made is checked is the same as that in the first embodiment, a description thereof will be omitted.

Of course, as in the first embodiment, when the number of lines to which errors are diffused is n, the image conversion process can be skipped only when (n+1) or more blank lines successively appear. At this time, the threshold value of the parameter count in step S2205 shown in FIG. 22 must be set to be n+1, as described above.

With the above process, the image conversion process can be appropriately skipped, and a high-speed process can be realized as in the first embodiment. As a result, another process can be made in place of the skipped image conversion process, and image data sent from the PC can be output at high speed from a printer or digital copying machine.

[Third Embodiment]

The third embodiment of the present invention will be described in detail below with reference to the accompanying drawings.

The same reference numerals in the basic apparatus arrangement in the third embodiment denote the same parts as in the first embodiment, and a description thereof will be omitted. A characteristic feature of the third embodiment lies in that the error diffusion process used in the error diffusion processor 2302 of the second embodiment is replaced by a minimized error method that collects errors.

Since the basic arrangement except for the image conversion processing circuit is the same as that in the first and second embodiments, only differences will be explained. Also, since the basic concept of the minimized error method is the state-of-the-art technique, a detailed description thereof will be omitted, but only a point associated with this embodiment will be explained.

FIG. 25 shows a collection method of collecting errors in contrast to the error diffusion method that diffuses errors, as described in the second embodiment. In FIG. 25, "*" indicates the position of a pixel of interest, and numerical values around the pixel of interest are minimized error coefficients. This minimized error method processes respective pixels while holding a binarization error generated at the pixel of interest without diffusing it. Also, the method of correcting an image signal value of the pixel of interest is largely different from the error diffusion process. That is, if Ei,j represents a binarization error calculated at each pixel, an image signal value D is corrected by:

D+(Ei,j×n÷(7+5+3+5+7+5+3+1+3+5+3+1)

where n is the minimized error coefficient shown in FIG. 25, and i,j of Ei,j is an error collection range. In the third embodiment, i=−2 to 2, and j=−2 to 0.

That is, this method collects quantization errors generated previously from pixels around the pixel of interest.

An image signal corrected in this manner is binarized using an arbitrary slice level.

The aforementioned minimized error method refers to previous processing results with respect to the position of the pixel of interest. This is the same as the average density preservation method in the first embodiment. Hence, in this case, even when an input line of the pixel of interest is "0", the binarization result must not be immediately replaced by "0".

For this reason, the present invention can be applied to the minimized error method of the third embodiment. Since the third embodiment refers to error values of two lines before the pixel of interest, whether or not line skip is made is checked by the process shown in FIG. 22 as in the first embodiment. Since the process after whether or not line skip is made is checked is the same as that in the first embodiment, a description thereof will be omitted.

Of course, as in the first and second embodiments, when the number of lines from which errors are collected is n, the image conversion process can be skipped only when (n+1) or more blank lines successively appear. At this time, the threshold value of the parameter count in step S2205 shown in FIG. 22 is set to be n+1.

With the above process, the image conversion process can be appropriately skipped, and a high-speed process can be realized as in the first and second embodiments. As a result, another process can be made in place of the skipped image conversion process, and image data sent from the PC can be output at high speed from a printer or digital copying machine.

In the embodiments described above, the average density preservation processing method, error diffusion processing method, and minimized error method have been exemplified. However, the present invention is not limited to such specific methods, and can be applied to an image conversion process which executes a process with reference to a region other than the pixel of interest.

In the above embodiments, binarization has been exemplified. However, the present invention is not limited to this, and may be applied to conversion to n-valued data (n>1).

Furthermore, the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the above embodiments, since an image conversion process that requires a heavy load is skipped in accordance with a feature of an image to be processed, a high-speed image process can be realized.

The preferred embodiments of the present invention have been explained. However, the present invention is not limited to the aforementioned specific embodiments, and various modifications may be made within the scope of the claims.

What is claimed is:

1. An image processing apparatus for inputting N-bit multi-valued image information having density information, converting the input image information into M-bit (N≧M) image information, and outputting the converted image information, comprising:
   generation means for generating information indicating whether or not an image conversion process is made for one line including a pixel of interest of the multi-valued image information, on the basis of the multi-valued image information; and
   control means for controlling to inhibit execution of the image conversion process for one line including the pixel of interest of the multi-valued image information in accordance with the generated information.

2. The apparatus according to claim 1, wherein the image conversion process is executed also with reference to pixels other than the pixel of interest.

3. The apparatus according to claim 2, wherein the pixels to be referred to by the image conversion process are pixels which neighbor the pixel of interest.

4. The apparatus according to claim 3, wherein the pixels to be referred to by the image conversion process include not less than one line different from the line including the pixel of interest.

5. The apparatus according to claim 1, wherein the image conversion process comprises means for obtaining a quantization error generated upon image conversion.

6. The apparatus according to claim 1, wherein the image conversion process comprises means for making an error correction for the pixel of interest.

7. The apparatus according to claim 1, wherein said generation means generates binary information indicating whether or not image information other than a predetermined value is present in the line including the pixel of interest of the multi-valued image information.

8. The apparatus according to claim 1, wherein said control means controls to inhibit execution of the image conversion process upon executing the image conversion process only when the generated information indicating that the image conversion process is to be skipped successively appears for a number of times not less than the number of lines required for the process+1.

9. The apparatus according to claim 8, wherein said control means forcibly sets a processing result of the image conversion process to be a predetermined value when said control means inhibits execution of the image conversion process.

10. The apparatus according to claim 9, wherein information from said generation means and an output from the image conversion process are logically ANDed and output.

11. The apparatus according to claim 9, further comprising image scanning means for sequentially scanning images of a plurality of documents, and sequentially outputting scanned image information.

12. The apparatus according to claim 1, wherein said apparatus is connected via a network to image forming means for forming a visible image of the image information that has been converted into the M-bit image information.

13. A method of controlling an image forming apparatus which inputs N-bit multi-valued image information having density information, converts the input image information into M-bit (N≧M) image information, and outputs the converted image information, comprising the steps of:
   generating information indicating whether or not an image conversion process is made for one line including a pixel of interest of the multi-valued image information, on the basis of the multi-valued image information; and
   controlling to inhibit execution of the image conversion process for one line including the pixel of interest of the multi-valued image information in accordance with the generated information.

14. The method according to claim 13, wherein the image conversion process is executed also with reference to pixels other than the pixel of interest.

15. The method according to claim 14, wherein the pixels to be referred to by the image conversion process are pixels which neighbor the pixel of interest.

16. The method according to claim 15, wherein the pixels to be referred to by the image conversion process include not less than one line different from the line including the pixel of interest.

17. The method according to claim 13, wherein the image conversion process comprises the step of obtaining a quantization error generated upon image conversion.

18. The method according to claim 13, wherein the image conversion process comprises the step of making an error correction for the pixel of interest.

19. The method according to claim 13, wherein the generation step includes the step of generating binary information indicating whether or not image information other than a predetermined value is present in the line including the pixel of interest of the multi-valued image information.

20. The method according to claim 13, wherein the control step includes the step of controlling to inhibit execution of the image conversion process upon executing the image conversion process only when the generated information indicating that the image conversion process is to be skipped successively appears for a number of times not less than the number of lines required for the process+1.

21. The method according to claim 20, wherein the control step includes the step of forcibly setting a processing result of the image conversion process to be a predetermined value when execution of the image conversion process is inhibited.

22. A computer readable recording medium that records a program for making a computer function as:

generation means for generating information indicating whether or not an image conversion process is made for one line including a pixel of interest of multi-valued image information, on the basis of the multi-valued image information; and control means for controlling to inhibit execution of the image conversion process for one line including the pixel of interest of the multi-valued image information in accordance with the generated information.

* * * * *

UNITED STATES PATENT AND TRADEMARK OFFICE
CERTIFICATE OF CORRECTION

| | |
|---|---|
| PATENT NO. | : 7,170,636 B2 |
| APPLICATION NO. | : 10/174989 |
| DATED | : January 30, 2007 |
| INVENTOR(S) | : Hiroshi Kaburagi |

It is certified that error appears in the above-identified patent and that said Letters Patent is hereby corrected as shown below:

COLUMN 1:

Line 25, "inc." should read --Inc.--.

COLUMN 7:

Line 6, "lowers." should read --decreases.--.

COLUMN 8:

Line 27, "it" should read --them--.

COLUMN 10:

Line 26, "Random number=$(1-2*p[22])*(((p[15]*64+p[16]*32+p[17]*16+p[18]*8+p[19]*4+p[20]*2+p[21])*17)/128)$" should read
--Random number
$= (1-2*p[22])*(((p[15]*64+p[16]*32+p[17]*16+p[18]*8+p[19]*4+p[20]*2+p[21])*17)/128)$--; and Line 34, "Random number=$(1-2*p[2])*(p[18]*8+p[19]*4+p[20]*2+p[21])$" should read --Random number
$= (1-2*p[2])*(p[18]*8+p[19]*4+p[20]*2+p[21])$--.

COLUMN 13:

Line 66, "result" should read --result,--.

UNITED STATES PATENT AND TRADEMARK OFFICE
CERTIFICATE OF CORRECTION

PATENT NO. : 7,170,636 B2
APPLICATION NO. : 10/174989
DATED : January 30, 2007
INVENTOR(S) : Hiroshi Kaburagi It is certified that error appears in the above-identified patent and that said Letters Patent is hereby corrected as shown below:

COLUMN 16:

Line 64, "equipment" should read --piece of equipment--.

Signed and Sealed this

Twelfth Day of August, 2008

JON W. DUDAS
*Director of the United States Patent and Trademark Office*